(12) United States Patent
Meketa et al.

(10) Patent No.: US 10,875,953 B2
(45) Date of Patent: Dec. 29, 2020

(54) SOLUBILIZED ALKOXYLATED CALIXARENE RESINS

(71) Applicant: SI GROUP, INC., Schenectady, NY (US)

(72) Inventors: Matthew Meketa, Schenectady, NY (US); Cornelius Haase, Schenectady, NY (US); Robert Cable, Schenectady, NY (US); Ricky Biittig, Schenectady, NY (US); Allyson Staats, Schenectady, NY (US)

(73) Assignee: SI GROUP, INC., Schenectady, NY (US)

( * ) Notice: Subject to any disclaimer, the term of this patent is extended or adjusted under 35 U.S.C. 154(b) by 285 days.

(21) Appl. No.: 15/879,270

(22) Filed: Jan. 24, 2018

(65) Prior Publication Data

US 2018/0208702 A1      Jul. 26, 2018

Related U.S. Application Data

(60) Provisional application No. 62/529,343, filed on Jul. 6, 2017, provisional application No. 62/529,317, filed on Jul. 6, 2017, provisional application No. 62/450,288, filed on Jan. 25, 2017.

(51) Int. Cl.
| | | |
|---|---|---|
| *C08G 8/36* | (2006.01) | |
| *C08G 8/12* | (2006.01) | |
| *B01D 17/04* | (2006.01) | |
| *C10G 33/04* | (2006.01) | |
| *C08L 61/14* | (2006.01) | |

(52) U.S. Cl.
CPC .............. *C08G 8/36* (2013.01); *B01D 17/047* (2013.01); *C08G 8/12* (2013.01); *C08L 61/14* (2013.01); *C10G 33/04* (2013.01); *C10G 2300/1033* (2013.01)

(58) Field of Classification Search
CPC ........... C08G 8/36; C08G 8/12; B01D 17/047
See application file for complete search history.

(56) References Cited

U.S. PATENT DOCUMENTS

| 4,032,514 | A | * | 6/1977 | Buriks .................... C08G 8/28 525/507 |
| 4,046,521 | A | | 9/1977 | Bessler et al. |
| 4,259,464 | A | | 3/1981 | Buriks et al. |
| 5,039,437 | A | | 8/1991 | Martella et al. |
| 5,138,883 | A | | 8/1992 | Paquet et al. |
| 5,205,964 | A | | 4/1993 | Stephenson et al. |
| 5,272,226 | A | * | 12/1993 | Lancaster ................ C08G 8/28 525/480 |
| 6,399,549 | B1 | | 6/2002 | Taylor et al. |
| 6,984,599 | B2 | | 1/2006 | Nagy |
| 7,425,602 | B2 | | 9/2008 | Howard et al. |
| 7,514,197 | B2 | | 4/2009 | Ochiai et al. |
| 7,524,469 | B2 | | 4/2009 | Meikrantz et al. |
| 2012/0145542 | A1 | | 6/2012 | Nakamura et al. |
| 2012/0172270 | A1 | | 7/2012 | Dilsky |
| 2015/0184086 | A1 | | 7/2015 | Rankin et al. |
| 2016/0108231 | A1 | | 4/2016 | Aube et al. |
| 2017/0292657 | A1 | | 10/2017 | Kundu |

FOREIGN PATENT DOCUMENTS

| EP | 0450874 A2 | 10/1991 |
| EP | 0461554 A1 | 12/1991 |
| GB | 1167427 | 10/1969 |
| GB | 2305437 A | 4/1997 |

OTHER PUBLICATIONS

Gutsche, "Calixarenes," Acc. Chem. Res. 16: 161-170 (1983).
Patrick et al., "An Improved Preparation of Phenolic [1.1.1.1]Metacyclophanes," J. Org. Chem. 42: 382-383 (1977).
Gutsche et al., "p-tert-BUTYLCALIX[4]ARENE," Organic Syntheses, Coll. 8: 75 (1993) and 68: 234 (1990).

* cited by examiner

*Primary Examiner* — Robert D Harlan
(74) *Attorney, Agent, or Firm* — Jeffrey N. Townes; Cozen O'Connor

(57) ABSTRACT

This invention relates to an alkoxylated calixarene resin comprising one or more modified calixarene alkoxylate compounds. The invention also relates to a process for preparing a solubilized alkoxylated calixarene resin comprising reacting a phenolic resin mixture, comprising linear phenolic resins and calixarene compounds having phenolic hydroxyl groups, with one or more epoxide-containing compounds to alkoxylate one or more of the phenolic hydroxyl groups of the calixarene compounds to form a solubilized phenolic resin mixture, and reacting the solubilized phenolic resin mixture with one or more alkylene oxides.

13 Claims, 5 Drawing Sheets

SOLUBILIZED ALKOXYLATED CALIXARENE RESINS

This application claims priority to U.S. Provisional Application No. 62/450,288, filed on Jan. 25, 2017; U.S. Provisional Application No. 62/529,343, filed on Jul. 6, 2017; and U.S. Provisional Application No. 62/529,317, filed on Jul. 6, 2017; all of which are herein incorporated by reference in their entirety.

FIELD OF THE INVENTION

This invention generally relates to a resin comprising modified calixarene alkoxylate compounds. This invention also generally relates to a process for preparing a calixarene resin. The invention also relates to a demulsifier composition comprising the calixarene resins.

BACKGROUND

Phenolic resins have been used as components of demulsifier and dehazer formulations, e.g., in oilfield, refining, and fuel applications. These resins are useful for the efficient separation of emulsions, e.g., separating oil from water. Depending how the phenolic resins are prepared, the phenolic resin may contain mainly linear phenolic resins or a mixture of linear phenolic resins and cyclic phenolic resins (e.g., calixarenes). For instance, certain oil field resins can contain 20% or more calixarenes.

It is advantageous to use phenolic resins containing a mixture of linear phenolic resins and cyclic phenolic resins because the linear/cyclic phenolic resin mixture is a more efficient demulsifier in certain oil emulsions compared to the phenolic resin containing mainly linear phenolic resins.

However, using the phenolic resins containing the linear/cyclic phenolic resin mixture can lead to the instability (or insolubility) problems associated with the product. When the phenolic resin containing such a mixture is prepared, significant amounts of insolubles will typically precipitate out of the resin solution. Thus, the final product can settle, forming a cake at the bottom of the container, that when stored for even a short period of time, makes it difficult to be processed further. To obviate this problem, the resin material can be made and shipped hot, provided that it is transported only short distances. However, this solution can significantly limit the utilization of the phenolic resin product.

Alkoxylated alkylphenol-formaldehyde resins have been used as demulsifier components for the separation of water-in-crude oil emulsions. These demulsifier components are usually oligomers with a linear alkylphenol-formaldehyde chain structure. Cyclic alkylphenol formaldehyde oligomers (i.e., calixarenes) can be demulsifier-intermediates in their alkoxylated form. However, as discussed above, the manufacture and utilization of calixarenes are challenging because calixarenes are notoriously insoluble in standard oilfield chemical solvents, which may present handling or compatibility issues for subsequent functionalization processes and may preclude their direct use in applications beyond demulsification.

Therefore, there is a need in the art to develop phenolic resins containing a mixture of linear and cyclic phenolic resins with improved solubility or stability in a hydrocarbon solvent. There is also a need in the art to develop a process to solubilize phenolic resins containing a mixture of linear and cyclic phenolic resin to improve the solubility of the phenolic resins in a hydrocarbon solvent. There is an additional need in the art to develop further processes to functionalize the solubilized phenolic resins, particularly for demulsifying applications. This invention answers those needs.

SUMMARY OF THE INVENTION

One aspect of the invention relates to an alkoxylated calixarene resin comprising one or more modified calixarene alkoxylate compounds. Each modified calixarene alkoxylate compound comprises 4-20 units of formula (IV), (V), and/or formula (VI):

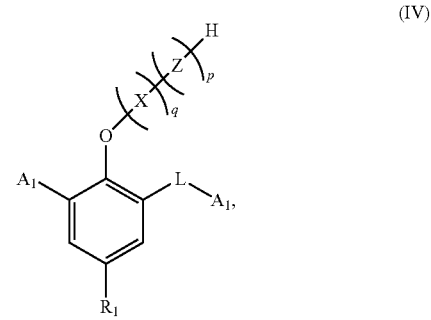

(IV)

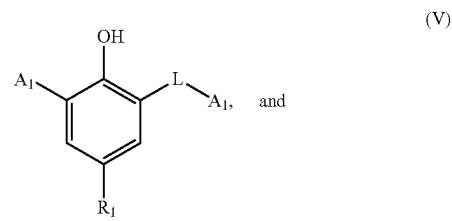

(V)

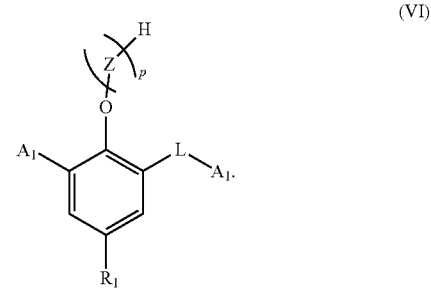

(VI)

In formulas (IV), (V), and (VI), each X is independently the same or different moiety, each moiety having a structure of

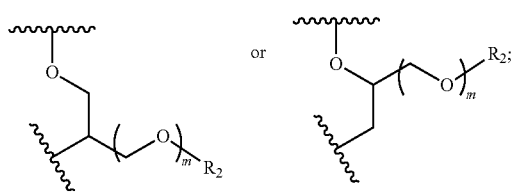

each Z is independently the same or different moiety, each moiety having a structure of

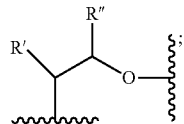

each R' and R" are independently H, or $C_1$ to $C_4$ alkyl; each $R_1$ is independently a H, $C_1$ to $C_{30}$ alkyl, phenyl, or arylalkyl; each $R_2$ is independently a H, $C_1$ to $C_{20}$ branched or unbranched alkyl which may optionally be substituted with one or more glycidyl ether units of the formula

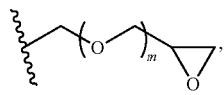

$C_2$ to $C_{10}$ alkenyl, or $C_5$ to $C_{10}$ aryl; each L is independently selected from the group consisting of —$CH_2$—, —C(O)—, —CH($R_3$)—, —($CH_2$)—O—($CH_2$)$_n$—, —C($R_3$)$_2$—, and —S—; each $R_3$ is independently a $C_1$-$C_6$ alkyl; each m is independently an integer from 0 to 10; each n is independently an integer from 1 to 2; each p is independently an integer from 1 to 150; each q is independently an integer from 1 to 100; and each $A_1$ represents a direct covalent bond to an adjacent unit of formula (IV), (V), or formula (VI) such that there is one L group between adjacent units, whereby the total units in the modified calixarene alkoxylate compound form a ring. The units of formula (IV) make up from about 35% to 100% of the overall units present in the calixarene compounds.

In one embodiment, the units of formula (IV) make up from about 50% to about 90% of the overall units present in the calixarene compounds.

In some embodiments, each m is 1. In one embodiment, each $R_2$ is independently selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. For instance, each $R_2$ is n-butyl. In one embodiment, each $R_2$ is independently a $C_1$ to $C_8$ branched or unbranched alkyl, substituted with one or more glycidyl ether units of the formula

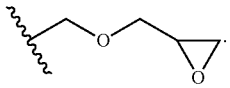

For instance, each $R_2$ is

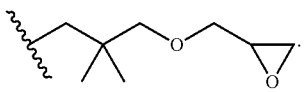 [SMILES: *CC(C)(C)COCC1CO1]

In some embodiments, each Z is

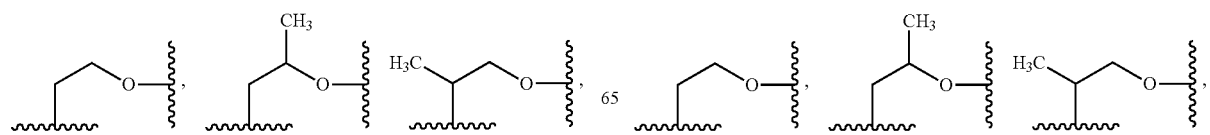

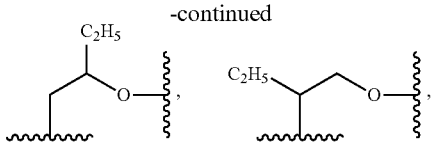

or a combination thereof. In one embodiment, each Z is

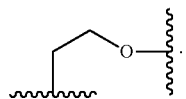 [SMILES: *CCO*]

In one embodiment, each p is independently 1-20.

In some embodiments, each $R_1$ is independently a $C_4$ to $C_{12}$ alkyl or $C_{24}$ to $C_{28}$ alkyl. In one embodiment, each $R_1$ is independently tert-butyl, tert-octyl, or nonyl.

In one embodiment, each L is independently —$CH_2$— or —$CH_2$—O—$CH_2$—.

In one embodiment, the total number of units in the calixarene compounds is from 4 to 8.

In one embodiment, one or more units in the modified calixarene alkoxylate compounds have the structure of

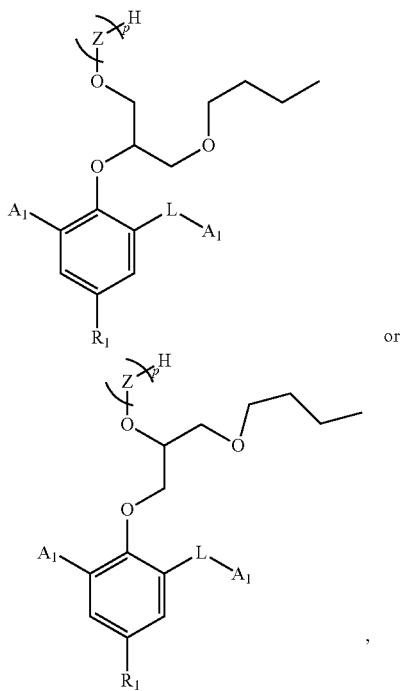

wherein:
each $R_1$ is independently a $C_4$ to $C_{12}$ alkyl; each Z is

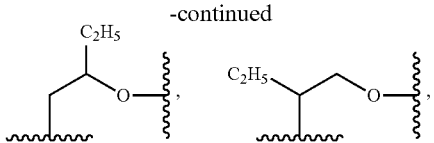

or a combination thereof;

each p is independently 1-20;

each L is independently —CH$_2$— or —CH$_2$—O—CH$_2$—; and the total units in the calixarene compounds is from 4 to 8.

In one embodiment, the alkoxylated calixarene resin has a solubility in a hydrocarbon solvent increased by at least 20% compared to a resin comprising calixarene compounds containing units of formula (V) and/or (VI), but no units of formula (IV).

Another aspect of the present invention relates to a resin solution comprising the alkoxylated calixarene resin described in the above aspect or embodiments. The alkoxylated calixarene resin is dissolved in a hydrocarbon solvent having a concentration of about 50 wt % to about 75 wt %.

In some embodiments, the hydrocarbon solvent is an aromatic hydrocarbon solvent. In one embodiment, the aromatic hydrocarbon solvent is toluene, xylene, tetralin, a $C_9$-$C_{10}$ aromatic hydrocarbon solvent, or a $C_{10}$-$C_{12}$ aromatic hydrocarbon solvent.

In one embodiment, the alkoxylated calixarene resin is soluble in a hydrocarbon solvent at room temperature or above.

In one embodiment, the alkoxylated calixarene resin is soluble in a hydrocarbon solvent at a temperature of −25° C. or above.

Another aspect of the invention relates to a process for preparing a solubilized alkoxylated calixarene resin. The process comprises reacting a phenolic resin mixture, comprising linear phenolic resins and calixarene compounds having phenolic hydroxyl groups, with one or more compounds of formula (III):

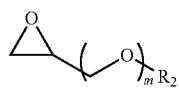

(III)

in a hydrocarbon solvent to alkoxylate one or more of the phenolic hydroxyl groups of the calixarene compounds to form a solubilized phenolic resin mixture. In formula (III), $R_2$ is a H, $C_1$ to $C_{20}$ branched or unbranched alkyl which may optionally be substituted with one or more glycidyl ether units of the formula

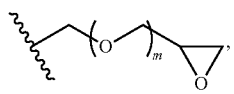

$C_2$ to $C_{10}$ alkenyl, or $C_5$ to $C_{10}$ aryl; and m is an integer from 0 to 10. The solubilized phenolic resin mixture is then reacted with one or more alkylene oxides, thereby forming a solubilized alkoxylated calixarene resin, wherein, on average, about 0.1 to about 150 moles of alkylene oxide reacts with each mole of the phenolic units in the solubilized phenolic resin mixture.

In one embodiment, the reaction of the phenolic resin mixture with the compound of formula (III) is carried out in the presence of a catalyst selected from the group consisting of sodium hydroxide, potassium hydroxide, sodium carbonate, potassium carbonate, sodium bicarbonate, potassium bicarbonate, triethylamine, imidazole, 2-methylimidazole, pyridine, and combinations thereof.

In one embodiment, the reaction of the phenolic resin mixture with the compound of formula (III) is carried out at an elevated temperature in the range of 110-170° C.

In some embodiments, m is 1. In one embodiment, $R_2$ is selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. For instance, $R_2$ is n-butyl.

In some embodiments, $R_2$ is a $C_1$ to $C_{20}$ branched or unbranched alkyl substituted with one or more glycidyl ether units of the formula

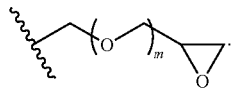

In one embodiment, $R_2$ is a $C_1$ to $C_8$ branched or unbranched alkyl substituted with one glycidyl ether units of the formula

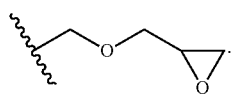

For instance, $R_2$ is

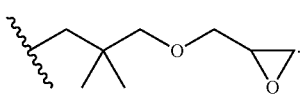

In one embodiment, the alkylene oxide is selected from the group consisting of ethylene oxide, propylene oxide, butylene oxide, and combinations thereof.

In one embodiment, the reaction of the solubilized phenolic resin mixture with the alkylene oxide is carried out at an elevated temperature in the range of 50-150° C.

In some embodiments, about 1 to about 20 moles of alkylene oxide reacts with each mole of the phenolic units in the solubilized phenolic resin mixture. In one embodiment, about 3 to about 10 moles of alkylene oxide reacts with each mole of the phenolic units in the solubilized phenolic resin mixture.

Another aspect of the present invention relates to a solubilized alkoxylated calixarene resins prepared from the processes described in the above aspects or embodiments.

Another aspect of the present invention relates to a demulsifier composition comprising one or more alkoxylated calixarene resins described in the above aspects or embodiments.

Another aspect of the present invention relates to a demulsifier composition comprising the solubilized alkoxylated calixarene resins prepared from the processes described in the above aspects or embodiments.

Another aspect of the present invention relates to a method of resolving a water-in-oil or oil-in-water emulsion.

The method comprises adding to a water-in-oil or oil-in-water emulsion an effective demulsifying amount of one or more solubilized alkoxylated calixarene resins described in the above aspects or embodiments.

In one embodiment, the water-in-oil or oil-in-water emulsion is a crude oil emulsion, a refinery desalting emulsion, or a crude oil production emulsion.

DETAILED DESCRIPTION OF THE INVENTION

Figure 1:
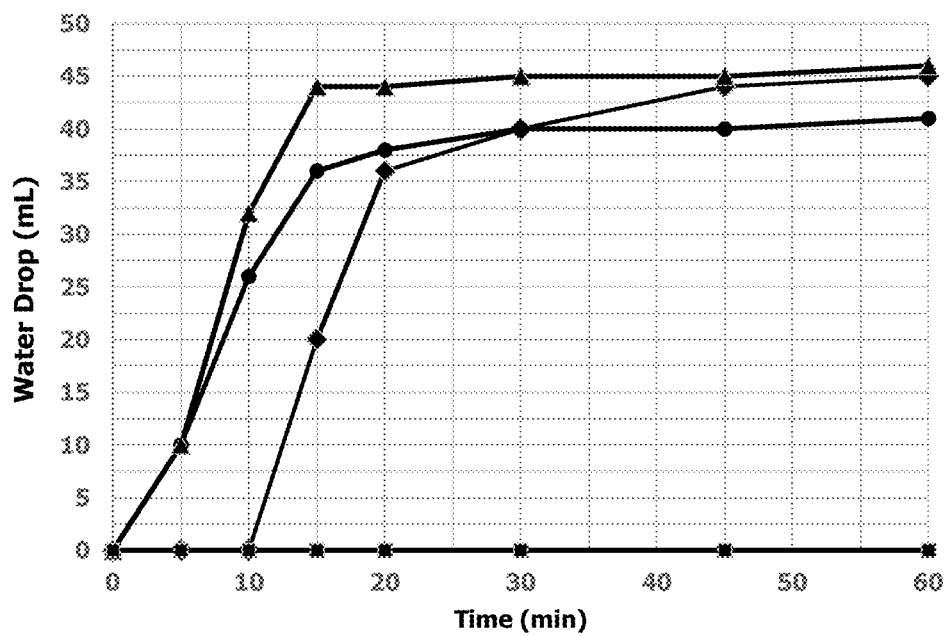
FIG. 1 shows the water drop test results for the crude oil sample mixed with the Nonyl Resin Alkoxylate (represented by the diamond symbols), Solubilized Calixarene Alkoxylate (represented by the circle symbols), Calixarene Alkoxylate (represented by the triangle symbols), and Blank (represented by the square symbols). The detailed description for each resin demulsifer is described in Example 4, above Table 1.

This invention relates to an alkoxylated calixarene resin comprising one or more modified calixarene alkoxylate compounds, and their applications thereof. Phenolic resins comprising linear phenolic resin and calixarene compounds are solubilized first with improved solubility in a hydrocarbon solvent at both room temperature and cold temperatures, e.g., at −25° C. The solubility of the resulting phenolic resin is dramatically improved, resulting in a stable, easy to handle calixarene/linear phenolic resin mixture. The solubilized phenolic resin mixture is then reacted with one or more alkylene oxides, resulting in a solubilized alkoxylated calixarene resin for utilization as a demulsifier to separate oil and water emulsion in applications such as oilfield, petroleum, and fuel applications.

The solubilized calixarene alkoxylate is chemically different than a calixarene alkoxylate prepared from a non-solubilized calixarene compound. Because of its enhanced solubility, the solubilized calixarene resin allows for improved handling by an alkoxylator, compared to its non-solubilized calixarene counterpart. Thus, using the solubilized alkoxylated calixarene resin can be advantageous on certain crude oil emulsions, while providing comparable or even better demulsifying performances than the non-solubilized calixarene alkoxylates.

Preparation of stabilized (solubilized) phenolic resin mixture

One aspect of the invention relates to a resin comprising one or more modified calixarene compounds, each calixarene compound comprising 4-20 units of formula (I) and/or formula (II):

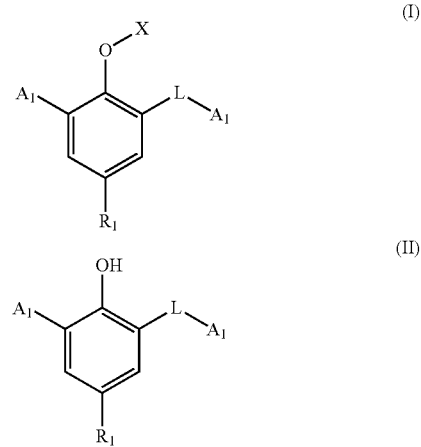

wherein each X is independently

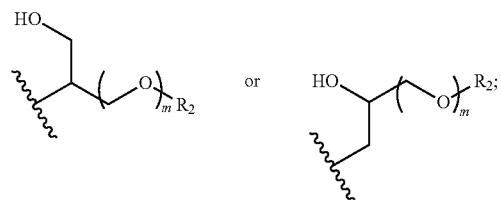

each $R_1$ is independently a H, $C_1$ to $C_{30}$ alkyl, phenyl, or arylalkyl; each $R_2$ is independently a H, $C_1$ to $C_{20}$ branched or unbranched alkyl which may optionally be substituted with one or more glycidyl ether units of the formula

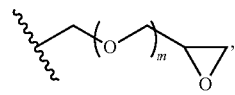

$C_2$ to $C_{10}$ alkenyl, or $C_5$ to $C_{10}$ aryl; each L is independently selected from the group consisting of —$CH_2$—, —C(O)—, —CH($R_3$)—, —($CH_2$)$_n$—O—($CH_2$)$_n$—, —C($R_3$)$_2$—, and —S—; each $R_3$ is independently a $C_1$-$C_6$ alkyl; each m is independently an integer from 0 to 10, for instance, from 0 to 3; each n is independently an integer from 1 to 2; each $A_1$ represents a direct covalent bond to an adjacent unit of formula (I) or formula (II) such that there is one L group between adjacent units, whereby the total units in the calixarene compound form a ring; and wherein units of formula (I) make up from about 35% to 100% of the overall units present in the calixarene compound.

The term "stable" is used herein as a measure of solubility, i.e., whether the phenolic resins containing the linear/cyclic phenolic resin mixture are soluble enough so that when the phenolic resin containing such a mixture is prepared, significant amounts of insolubles will not precipitate out of the resin solution, and the resulting resin would be suitable for storage and/or can be more easily handled or transported at room temperature without precipitation.

The phenolic resins of the invention include a mixture of linear phenolic resins and cyclic phenolic resins, such as calixarenes.

The linear phenolic resins may contain a substituent on the benzene ring, at either the ortho or para position to the hydroxyl of linear phenolic resins. Typically, the linear phenolic resin has a structure of Formula (A):

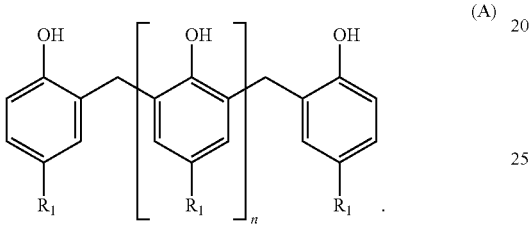

(A)

The substituent group on the benzene ring of the linear phenolic resin ($R_1$ in Formula (A)) may be independently H, $C_1$ to $C_{30}$ alkyl, phenyl, or arylalkyl. For instance, the substituent group ($R_1$ in Formula (A)) may be independently $C_4$ to $C_{18}$ alkyl, $C_4$ to $C_{12}$ alkyl, or $C_1$ to $C_7$ alkyl. In one embodiment, at least one substituent group ($R_1$ in Formula (A)) on the benzene ring of the linear phenolic resin is $C_1$ to $C_5$ alkyl, such as $C_4$ or $C_5$ alkyl. The number of repeating units of the linear phenolic resin (n in Formula (A)) may be 2 to 20, for instance, 2 to 10, 2 to 8, 2 to 6, or 2 to 4, resulting in a molecular weight typically ranging from about 500 to about 10,000 Daltons, for instance, from about 500 to about 5,000 Daltons, or from about 500 to about 3,000 Daltons.

The phenolic resins contain calixarenes ranging from about 35% to about 100%, for instance, from about 40% to about 90%, from about 50% to about 90%, from about 50% to about 80%, or from about 55% to about 75%.

The term "calixarene" generally refers to a variety of derivatives that may have one or more substituent groups on the hydrocarbons of cyclo{oligo[(1,3-phenylene)methylene]}. The calixarenes may contain a substituent on the benzene ring of calixarenes. Typically, the calixarene has a structure of Formula (B):

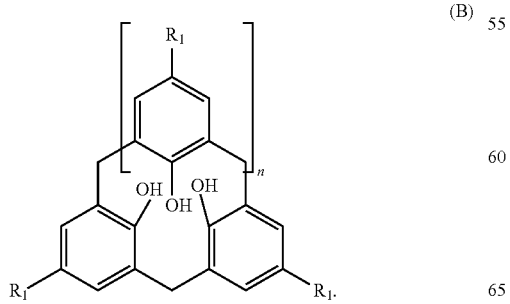

(B)

The substituent group on the benzene ring of the calixarene ($R_1$ in Formula (B)) may be independently H, $C_1$ to $C_{30}$ alkyl, phenyl, or arylalkyl. For instance, the substituent group ($R_1$ in Formula (B)) may be independently $C_4$ to $C_{18}$ alkyl, $C_4$ to $C_{12}$ alkyl, or $C_1$ to $C_7$ alkyl. In one embodiment, at least one substituent group ($R_1$ in Formula (B)) on the benzene ring of the calixarene is $C_1$ to $C_5$ alkyl, such as $C_4$ or $C_5$ alkyl. The number of repeating units of the calixarene (n in Formula (II)) may be 2 to 20, for instance, 2 to 10, 2 to 8, 2 to 6, or 2 to 4, resulting in a molecular weight typically ranging from about 500 to about 10,000 Daltons, for instance, from about 500 to about 5,000 Daltons, or from about 500 to about 3,000 Daltons. An exemplary calixarene structure is shown as below, wherein n is 2.

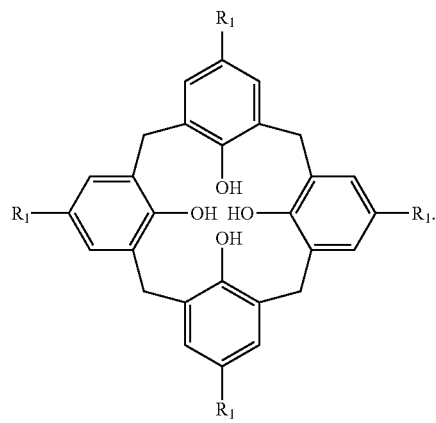

The calixarene compounds of the invention comprise 4-20 units of formula (I) and/or formula (II):

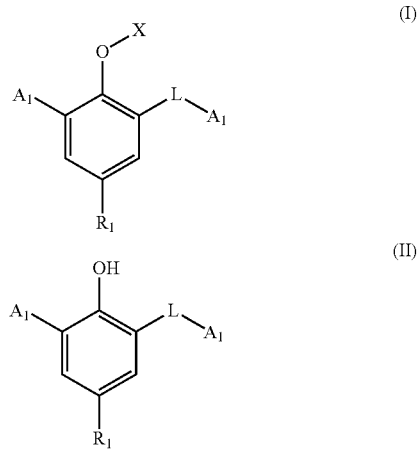

(I)

(II)

wherein each $A_1$ represents a direct covalent bond to an adjacent unit of formula (I) or formula (II) such that there is one L group between adjacent units, whereby the total units in the calixarene compound form a ring; and wherein units of formula (I) make up from about 35% to 100% of the overall units present in the calixarene compound. Thus, in the context of the invention, when a calixarene compound comprises 4 units of formula (I) and/or formula (II), the calixarene may range from having one unit of formula (I) and 3 units of formula (II), having the structure of to having all four units of the calixarene as formula (I), having the structure of

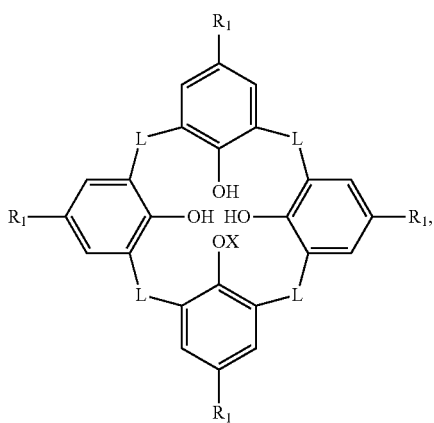

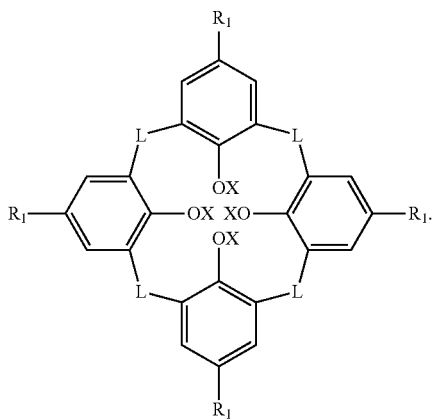

The calixarene compounds of the invention comprise 4-20 units of formula (I) and/or formula (II). For example, the calixarene compounds contain from 4-8 units, 2-6 units, 4-6 units, or 6 units.

The resins of the invention are modified to impart higher solubility in solvents. For example, the resins of the invention are modified to impart higher solubility in hydrocarbon solvents, such as aromatic hydrocarbon solvents (e.g., a $C_7$-$C_{12}$ aromatic hydrocarbon solvent or combinations thereof). Exemplary aromatic hydrocarbon solvents used in this invention include toluene, xylenes, tetralin, ShellSol® A150 ("A150," a $C_9$-$C_{10}$ aromatic hydrocarbon solvent) produced by Shell, ShellSol® A150ND ("A150ND," a $C_9$-$C_{10}$ aromatic hydrocarbon solvent with naphthalene depleted) produced by Shell and other aromatic hydrocarbon solvents known to one skilled in the art, such as Solvesso™ 150 produced by ExxonMobil Chemical (a $C_{10}$-$C_{12}$ aromatic hydrocarbon solvent).

In the context of the invention, phenolic hydroxyl groups of the resins are modified via alkoxylation with epoxide-containing compounds of formula (III):

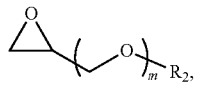

where $R_2$ is H, $C_1$ to $C_{20}$ branched or unbranched alkyl which may optionally be substituted with one or more glycidyl ether units of the formula

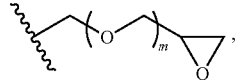

$C_2$ to $C_{10}$ alkenyl, or $C_5$ to $C_{10}$ aryl; and m is an integer from 0 to 10, for instance, from 0 to 8, from 0 to 6, or from 0 to 3, such as 1 or 2, resulting in higher stabilization to the resin. It will be appreciated by one having skill in the art that a higher degree of alkoxylation results in a higher imparted stability in the resins of the invention.

In one embodiment, phenolic hydroxyl groups of the resins are modified via alkoxylation with epoxide-containing compounds of formula (III):

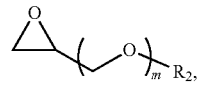

where m is 1 or 2. In an embodiment, $R_2$ is selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. For example, the phenolic hydroxyl groups of the resins are modified via alkoxylation with n-butyl glycidyl ether.

Alternatively, phenolic hydroxyl groups of the resins are modified via alkoxylation with epoxide-containing compounds of formula (III):

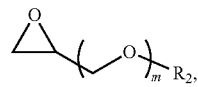

where m is 0. In an embodiment, $R_2$ is selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. For example, the phenolic hydroxyl groups of the resins are modified via alkoxylation with 2-phenyloxirane.

In another embodiment, phenolic hydroxyl groups of the resins are modified via alkoxylation with epoxide-containing compounds of formula (III):

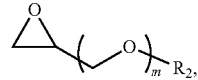

where $R_2$ is a $C_1$ to $C_{20}$ branched or unbranched alkyl which may optionally be substituted with one or more glycidyl ether units of the formula

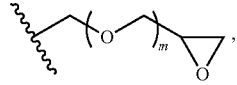

where m is an integer from 0 to 10, for instance, from 0 to 8, from 0 to 6, or from 0 to 3. For instance, the compound of formula (III) is a diglycidyl ether, triglycidyl ether, or tetraglycidyl ether, where $R_2$ is a $C_1$ to $C_{20}$ branched or unbranched alkyl, such as a $C_1$-$C_8$ branched or unbranched alkyl, or a $C_3$-$C_6$ branched alkyl, where the $R_2$ group is substituted with one, two, or three glycidyl ether units, respectively, of the formula

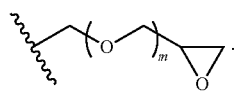

In one embodiment, the diglycidyl ether in the $R_2$ group is neopentyl glycol diglycidyl ether, where $R_2$ is

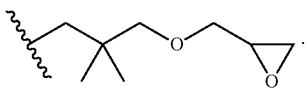

The phenolic hydroxyl groups of the resins may or may not all be alkoxylated with epoxide-containing compounds of formula (III). The resins of the invention contain calixarenes having from 35% to 100% of their phenolic hydroxyl groups having been alkoxylated and all integer ranges therebetween. For example, from about 40% to about 90%, from about 50% to about 90%, from about 50% to about 80%, or from about 55% to about 75% of the phenolic hydroxyl groups have been alkoxylated with the compound of formula (III).

In an embodiment of the invention, the calixarene compounds of the invention comprise 4-20 units of formula (I) and/or formula (II):

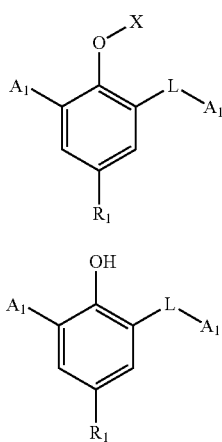

where each $R_1$ is independently a $C_4$ to $C_{12}$ alkyl group. Each $R_1$ may independently be a tert-butyl, nonyl, or tert-octyl group. The solubility improvement is particularly useful to those calixarene compounds having a lower alkyl as the $R_1$ substituent. For instance, calixarene compounds in which at least one $R_1$ group is $C_1$ to $C_5$ alkyl, such as $C_4$ or $C_5$ alkyl. Alternatively, the $R_1$ groups are higher alkyl substituents. For example, each $R_1$ may be a $C_{24}$ to $C_{28}$ alkyl group. The calixarene compound may contain units of formula (I) and/or formula (II) independently containing random combinations of various $R_1$ groups.

In an embodiment, the one or more units in the modified calixarene compounds has the structure of

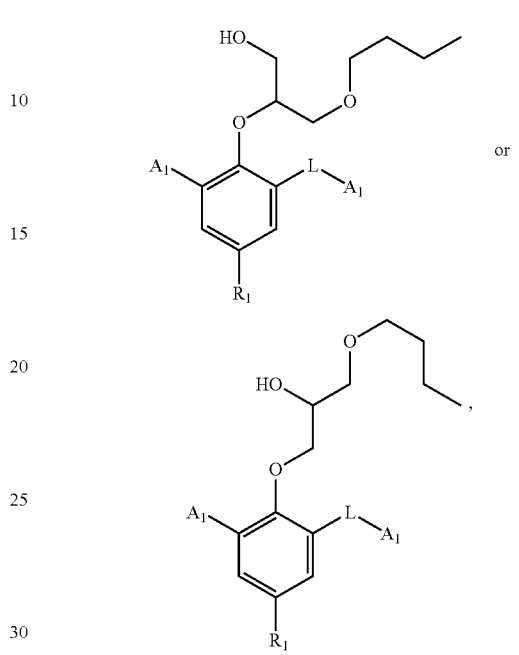

wherein: each $R_1$ is independently a $C_4$ to $C_{12}$ alkyl, and the total number of units in the calixarene compounds is from 4-8. The phenolic hydroxyl groups of the resin may react with an epoxide at the less-substituted and/or more-substituted epoxide carbon, resulting in regioisomer formation. The regioselectivity of the alkoxylation can be controlled by means apparent to one having skill in the art, for instance, by controlling solvent selection, sterics, and/or pH.

Adjacent phenol rings of the phenol resin are connected together through an L group. For example, two units of formula (I) connected together have the structure of

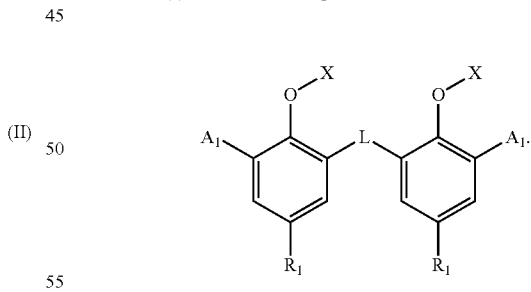

L groups are selected from the group consisting of —$CH_2$—, —$C(O)$—, —$CH(R_3)$—, —$(CH_2)_n$—O—$(CH_2)_n$—, —$C(R_3)_2$—, and —S—; where each $R_3$ is independently a $C_1$-$C_6$ alkyl; and each n is independently an integer from 1 to 2. For example, L may be —$CH_2$— or —$CH_2$—O—$CH_2$—.

Another aspect of the invention relates to a resin solution of a phenolic resin, comprising one or more modified calixarene compounds. Each calixarene compound comprises 4-20 units of formula (I')

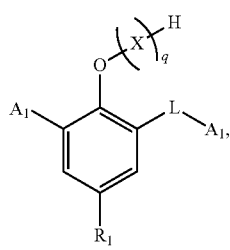

and/or formula (II),

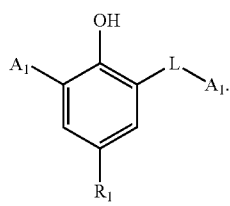

Each X is independently the same or different moiety, each moiety having a structure of

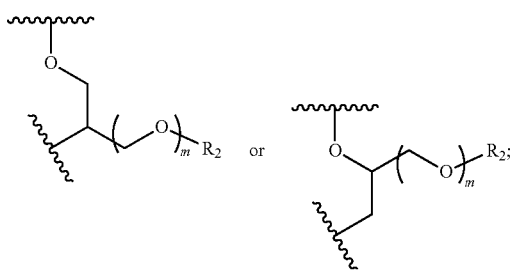

each $R_1$ is independently a H, $C_1$ to $C_{30}$ alkyl, phenyl, or arylalkyl; each $R_2$ is independently a H, $C_1$ to $C_{20}$ branched or unbranched alkyl which may optionally be substituted with one or more glycidyl ether units of the formula

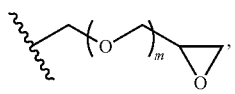

$C_2$ to $C_{10}$ alkenyl, or $C_5$ to $C_{10}$ aryl; each L is independently selected from the group consisting of —$CH_2$—, —C(O)—, —CH($R_3$)—, —$(CH_2)_n$—O—$(CH_2)_n$—, —C($R_3$)$_2$—, and —S—; each $R_3$ is independently a $C_1$-$C_6$ alkyl; each m is independently an integer from 0 to 10; each n is independently an integer from 1 to 2; each q is independently an integer from 1 to 100; and each $A_1$ represents a direct covalent bond to an adjacent unit of formula (I) or formula (II) such that there is one L group between adjacent units, whereby the total units in the calixarene compound form a ring. The phenolic resin is soluble in a hydrocarbon solvent having a concentration of about 50 wt % to about 75 wt %.

The units of formula (I') make up from about 35% to 100% of the overall units present in the calixarene compound, for instance, from about 40% to about 90%, from about 50% to about 90%, from about 50% to about 80%, or from about 55% to about 75% of the overall units present in the calixarene compound.

The modified calixarene compounds comprise 4-20 units of formula (I') and/or formula (II). For example, the modified calixarene compounds can contain from 4 to 8 units, from 2 to 6 units, from 4 to 6 units, or 6 units of formula (I') and/or formula (II).

In formulas (I'), each X is independently

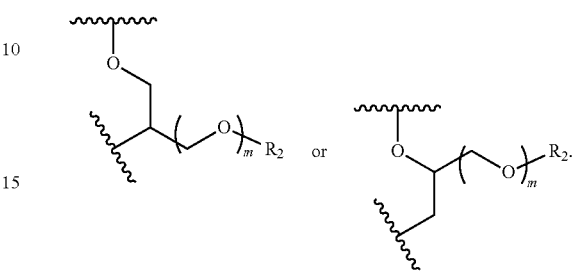

The variable X is the result from the alkoxylations of the phenolic hydroxyl groups of the calixarene compounds with epoxide-containing compounds of formula (III):

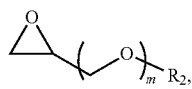

as described above. X is selected from the two regioisomers because, as described above, the phenolic hydroxyl groups may react with an epoxide at the less-substituted and/or more-substituted epoxide carbon, resulting in regioisomer formation. Depending on the degree of alkoxylation, the modified calixarene compound can contain q units of X, which can be a random combination of the two regioisomers. One skilled in the art would understand that the two ⸱ in each structure represent the connection points of the X moiety to the formula, so that the carbon atom of the X moiety is connected to the oxygen atom in the phenolic unit of formula (I') or in a different X moiety, and the oxygen atom of the X moiety is connected to the carbon atom in a different X moiety or to the hydrogen atom of formula (I'). For instance, an illustrative structure of formula (I') containing two units of X moieties can have a structure of

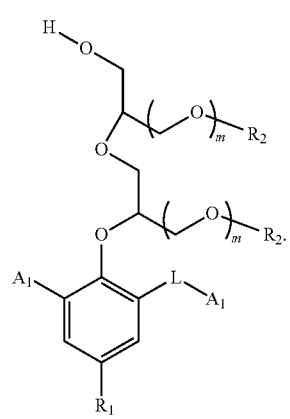

Each q is independently an integer from 1 to 100. The variable q represents the degree of alkoxylation by the compound of formula (III). For instance, each q in each unit of the formula (I') can be independently 1 to 50, 1 to 20, 1 to 10, 1 to 5, 1 to 3, 1 to 2, or 1. In one embodiment, q is 1 in one or more units in the modified calixarene compounds.

The alkoxylations of the phenolic hydroxyl groups of the calixarene compounds by reacting, on average, 1 mole of the compounds of formula (III) for each mole of the phenolic units of the phenolic resin may produce a calixarene compound in which q is 1 on each phenolic unit. It is possible, however, such alkoxylation may also produce a calixarene compound in which q is 2 or more on one or more phenolic units whereas the phenolic hydroxyl groups on other phenolic units of the calixarene compound are left unmodified, as in Formula (II), in which q would effectively be zero. It is also possible that such alkoxylation may produce certain calixarene compounds in which the q values vary on one or more of their phenolic units, and certain calixarene compounds that are completely unmodified, i.e., q is zero in each of their phenolic units.

In formulas (I') and (II), each $R_1$ is independently a H, $C_1$ to $C_{30}$ alkyl, phenyl, or arylalkyl. Exemplary $R_1$ groups are $C_4$ to $C_{12}$ alkyls. For instance, each $R_1$ is independently tert-butyl, tert-octyl, nonyl, or combinations thereof. In one embodiment, at least one $R_1$ group is $C_1$ to $C_5$ alkyl, such as $C_4$ or $C_5$ alkyl. Other exemplary $R_1$ groups are higher alkyl substituents, such as a $C_{24}$ to $C_{28}$ alkyl group. The calixarene compound may contain units of formula (I') and/or formula (II) independently containing random combinations of various $R_1$ groups.

In the phenolic resins, one or more phenolic hydroxyl groups of the resins are modified via alkoxylation with epoxide-containing compounds of formula (III):

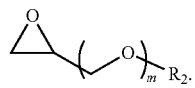

As discussed above, each m is independently an integer from 0 to 10, for instance, from 0 to 8, from 0 to 6, or from 0 to 3. Each $R_2$ is independently a H, $C_1$ to $C_{20}$ branched or unbranched alkyl which may optionally be substituted with one or more glycidyl ether units of the formula

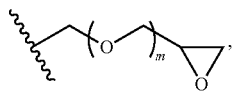

$C_2$ to $C_{10}$ alkenyl, or $C_5$ to $C_{10}$ aryl.

In certain embodiments, each m is independently 1 or 2. For instance, each m is 1. In certain embodiments, each $R_2$ is independently selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. For instance, $R_2$ may be butyl, such as n-butyl. In this case, each X would independently have a structure of

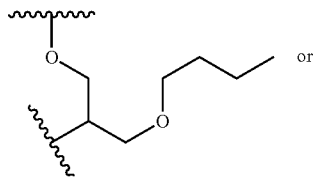

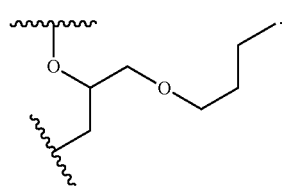

Alternatively, each $R_2$ may be independently a $C_1$ to $C_{20}$ branched or unbranched alkyl which may optionally be substituted with one or more glycidyl ether units of the formula

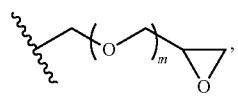

in which m is as defined above. For instance, each $R_2$ can be independently a $C_1$ to $C_8$ branched or unbranched alkyl, substituted with one glycidyl ether units of the formula

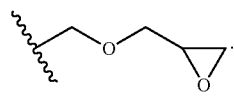

Exemplary $R_2$

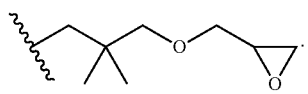 [SMILES: *CC(C)(C)COCC1CO1]

In this case, each X would independently have a structure of

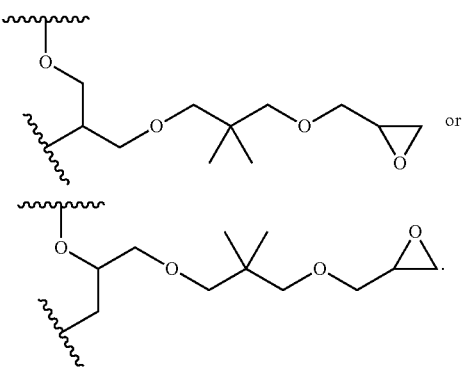

In certain embodiments, each m is 0. In one embodiment, each $R_2$ is independently selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. Exemplary $R_2$ is phenyl. In this case, each X would independently have a structure of

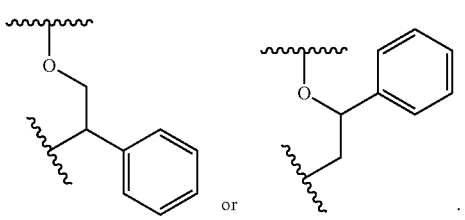 [SMILES: *OCC(*)c1ccccc1 ; *CC(O*)c1ccccc1]

In the calixarene compounds, whether modified or unmodified, adjacent phenol rings of the phenol resin are connected together through an L group. Each $A_1$ represents a direct covalent bond to an adjacent unit of formula (I') or formula (II) such that there is one L group between adjacent units, whereby the total units in the calixarene compound form a ring. Each L group is selected from the group consisting of $-CH_2-$, $-C(O)-$, $-CH(R_3)-$, $-(CH_2)_n-O-(CH_2)_n-$, $-C(R_3)_2-$, and $-S-$, in which each $R_3$ is independently a $C_1$-$C_6$ alkyl and each n is independently an integer from 1 to 2. For example, L may be $-CH_2-$ or $-CH_2-O-CH_2-$.

In some embodiments, one or more modified calixarene compounds have one or more units of formula (I') represented by the structure of

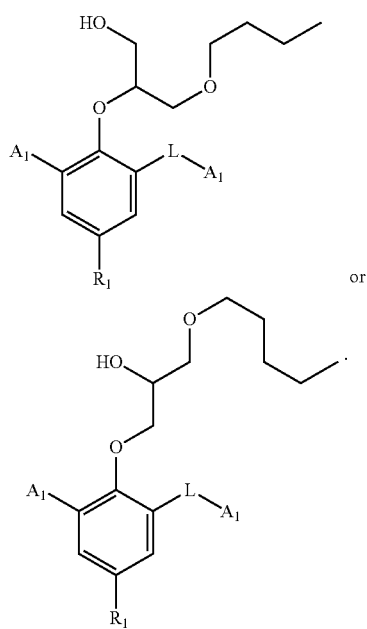

Each $R_1$ is independently a $C_4$ to $C_{12}$ alkyl; each L is independently selected from the group consisting of $-CH_2-$, $-C(O)-$, $-CH(R_3)-$, $-(CH_2)-O-(CH_2)_n-$, and $-C(R_3)_2-$; each $R_3$ is independently a $C_1$-$C_6$ alkyl; each n is independently an integer from 1 to 2; and the total number of units in the calixarene compounds is from 4 to 8. In one embodiment, each $R_1$ is independently tert-butyl, tert-octyl, nonyl, or combinations thereof. In one embodiment, at least one $R_1$ group is $C_1$ to $C_5$ alkyl, such as $C_4$ or $C_5$ alkyl. In one embodiment, each L is independently $-CH_2-$ or $-CH_2-O-CH_2-$. In one embodiment, the units of formula (I') having the above structure make up from about 50% to about 90% of the overall units present in the calixarene compound. For example, the units of formula (I') having the above structure make up from about 50% to about 80%, or from about 55% to about 75% of the overall units present in the calixarene compound.

After the alkoxylation with the compounds of formula (III), the resulting phenolic resins become soluble in a hydrocarbon solvent, such as an aromatic hydrocarbon solvent, resulting a highly concentrated resin solution that can have the concentration of the linear/cyclic phenolic resin to about 50 wt % to about 75 wt %. As discussed above, exemplary aromatic hydrocarbon solvents are toluene, xylene, tetralin, a $C_9$-$C_{10}$ aromatic hydrocarbon solvent (such as ShellSol® A150 or ShellSol® A150ND), or a $C_{10}$-$C_{12}$ aromatic hydrocarbon solvent (such as Solvesso™ 150).

The term "resin solution" means that the linear/cyclic phenolic resin mixture is soluble in a hydrocarbon solvent, as discussed above, capable of forming a resin solution that is substantially free of undissolved solid components, under a wide range of temperatures. Also, the linear/cyclic phenolic resin mixture is soluble enough that the resulting resin solution can be handled, transported, or stored for a long period of time under a wide range of temperatures without precipitation. For instance, the resin is soluble in a hydrocarbon solvent at room temperature or above, at 10° C. or above, at 0° C. or above, at −10° C. or above, at −20° C. or above, or at −25° C. or above. For instance, after the storage of 24 hours or longer, less than 20%, less than 10%, or less than 5% of solid components precipitate out of the solvent from the resin solution.

Accordingly, another aspect of the invention relates to a resin with an increased solubility in a hydrocarbon solvent, comprising one or more modified calixarene compounds. Each calixarene compound comprises 4-20 units of formula (I'),

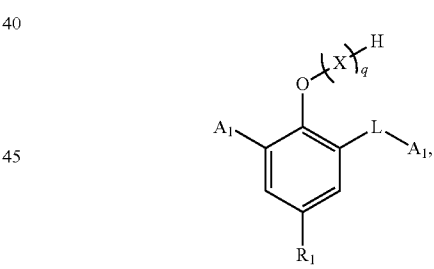

and/or formula (II),

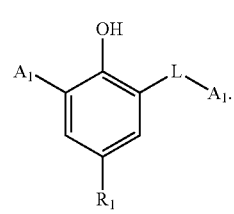

Each X is independently the same or different moiety, each moiety having a structure of

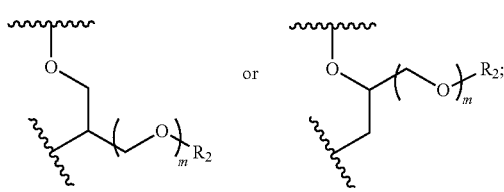

each $R_1$ is independently a H, $C_1$ to $C_{30}$ alkyl, phenyl, or arylalkyl; each $R_2$ is independently a H, $C_1$ to $C_{20}$ branched or unbranched alkyl which may optionally be substituted with one or more glycidyl ether units of the formula

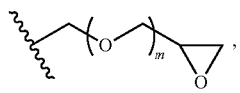

$C_2$ to $C_{10}$ alkenyl, or $C_5$ to $C_{10}$ aryl; each L is independently selected from the group consisting of —$CH_2$—, —C(O)—, —CH($R_3$)—, —($CH_2$)$_n$—O—($CH_2$)$_n$—, —C($R_3$)$_2$—, and —S—; each $R_3$ is independently a $C_1$-$C_6$ alkyl; each m is independently an integer from 0 to 10; each n is independently an integer from 1 to 2; each q is independently an integer from 1 to 100; and each $A_1$ represents a direct covalent bond to an adjacent unit of formula (I) or formula (II) such that there is one L group between adjacent units, whereby the total units in the calixarene compound form a ring. The units of formula (I') make up from about 35% to 100% of the overall units present in the calixarene compound.

The solubility of the resin is increased by at least 20%, for instance, at least 40%, at least 50%, at least 60%, at least 80%, at least 100%, or at least 120%, compared to a resin comprising calixarene compounds containing units of formula (II) but no units of formula (I').

This invention also relates to a process for stabilizing or solubilizing a phenolic resin containing a mixture of linear phenolic resins and cyclic phenolic resins (e.g., calixarene) to improve the solubility of the phenolic resin in a hydrocarbon solvent. The phenolic resin containing calixarenes is modified with an epoxide of formula (III), generating a partially alkoxylated derivative that is soluble in a hydrocarbon solvent at both room temperature and cold temperatures, e.g., at −25° C. Accordingly, the solubility of the resulting phenolic resin is dramatically improved, resulting in a stable, easy to handle calixarene/linear phenolic resin mixture intermediate for utilization as a demulsifier to separate oil and water emulsion in applications such as oilfield, petroleum, and fuel applications.

An aspect of the invention relates to a process for stabilizing or solubilizing a phenolic resin mixture, comprising: reacting a phenolic resin mixture comprising linear phenolic resins and calixarene compounds having pendant phenolic hydroxyl groups with one or more compounds of formula (III):

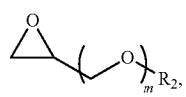

an optional catalyst, and at least one hydrocarbon solvent at an elevated temperature for a period of time sufficient to alkoxylate one or more of the phenolic hydroxyl groups of the linear phenolic resins and/or calixarene compounds in the phenolic resin mixture to result in a resin solution substantially free of undissolved solid components, wherein the solubility of the phenolic resin mixture is increased by at least 20% compared to a phenolic resin mixture that is not subjected to said reacting step, wherein $R_2$ is a H, $C_1$ to $C_{20}$ branched or unbranched alkyl which may optionally be substituted with one or more glycidyl ether units of the formula

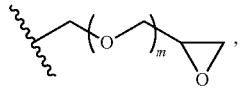

$C_2$ to $C_{10}$ alkenyl, or $C_5$ to $C_{10}$ aryl; and m is an integer from 0 to 10, for instance, from 0 to 8, from 0 to 6, or from 0 to 3. On average, about 0.1 to about 100 moles, about 0.1 to about 20 moles, about 0.2 to about 3 moles, or about 0.2 to 1 mole of epoxide the compounds of formula (III) may react with the phenolic hydroxyl groups of the calixarene compounds for each mole of the phenolic units of the phenolic resin.

This process forms a stabilized phenolic resin with an increased solubility in a hydrocarbon solvent as compared to an unmodified phenolic resin that has not been subjected to such process.

The catalyst in the process is optional and may be used to accommodate faster reaction times and/or lower reaction temperatures. In an embodiment, the catalyst is present in the process and is a base catalyst. Typical base catalysts used are selected from the group consisting of sodium hydroxide, potassium hydroxide, sodium carbonate, potassium carbonate, sodium bicarbonate, potassium bicarbonate, triethylamine, imidazole, 2-methylimidazole, pyridine, and combinations thereof. For instance, the catalyst may be 2-methylimidazole. The amount of catalyst, if present, may range from about 0.01 wt % to about 5 wt %. For example, the amount of catalyst, if present, may range from about 0.02 wt % to about 5 wt %, or from about 0.5 wt % to about 3 wt %, or from about 0.1 wt % to about 1 wt %, or from about 0.1 wt % to about 0.5 wt %, or from about 0.2 wt % to about 0.3 wt %.

The process for stabilizing a phenolic resin mixture is carried out at an elevated temperature, for instance, temperatures in the range of 110-170° C., such as 125-160° C., 140-155° C., or 145-155° C.

In an embodiment, less than 5% of residual compound of formula (III) remains unreacted within 1 hour of the start of the reaction (i.e., when the compound of formula (III) is added to the reaction system), for instance, less than 3%, or less than 1% of residual compound of formula (III) can remain unreacted within 1 hour of the start of the reaction.

As noted above, $R_2$ in formula (III):

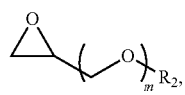

can be H, $C_1$ to $C_{20}$ branched or unbranched alkyl which may optionally be substituted with one or more glycidyl ether units of the formula

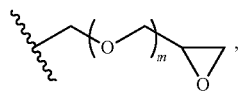

$C_2$ to $C_{10}$ alkenyl, or $C_5$ to $C_{10}$ aryl. Alternatively, $R_2$ can be hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl, and m=1. For example, $R_2$ can be n-butyl glycidyl ether.

The unmodified calixarene compounds of the invention comprise 4-20 units of formula (II):

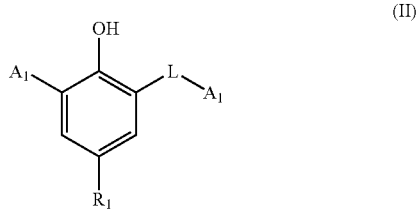

(II)

wherein each $R_1$ is independently a H, $C_1$ to $C_{30}$ alkyl, phenyl, or arylalkyl; each L is independently selected from the group consisting of —$CH_2$—, —C(O)—, —$CH(R_3)$—, —$(CH_2)_n$—O—$(CH_2)$—, —$C(R_3)_2$—, and —S—; each $R_3$ is independently a $C_1$-$C_6$ alkyl; each n is independently an integer from 1 to 2; each $A_1$ represents a direct covalent bond to an adjacent unit of formula (II) such that there is one L group between adjacent units, whereby the total units in the calixarene compound form a ring.

In one embodiment, each $R_1$ is independently a $C_4$ to $C_{12}$ or $C_{24}$ to $C_{28}$ alkyl; and wherein the total number of units in the calixarene compounds is from 4-8. In one embodiment, at least one $R_1$ group is $C_1$ to $C_5$ alkyl, such as $C_4$ or $C_5$ alkyl.

The stabilized or solubilized phenolic resin prepared from the processes described herein contain calixarenes having from 35% to 100% of their phenolic hydroxyl groups having been alkoxylated and all integer ranges therebetween. In one example, at least at least 35% of the phenolic hydroxyl groups in the resin have been alkoxylated with the compound of formula (III). In another example, at least 40% of the phenolic hydroxyl groups in the resin have been alkoxylated with the compound of formula (III). In another example, at least 50% of the phenolic hydroxyl groups in the resin have been alkoxylated with the compound of formula (III). In another example, at least 75% of the phenolic hydroxyl groups in the resin have been alkoxylated with the compound of formula (III). In another example, at least 90% of the phenolic hydroxyl groups in the resin have been alkoxylated with the compound of formula (III). In another example, at least 95% of the phenolic hydroxyl groups in the resin have been alkoxylated with the compound of formula (III).

The typical reaction process involves heating and mixing the calixarene containing resin slurry in aromatic hydrocarbon solvent, optionally, adding catalyst (e.g., 2-methylimidizole), at 30-50° C. The epoxide of formula (III) (e.g., a glycidyl ether) is then added and the mixture is heated to 125-155° C. The slurry appearance typically becomes noticeably darker as the reaction product becomes soluble in the aromatic solvent. In most cases this begins at 130° C. The mixture typically becomes completely soluble in the aromatic solvent at 125-155° C. after mixing for 10-30 minutes and the resulting solution is clear. Once clear the mixture is held at temperature for one to two hours to complete the reaction. The solution is cooled and analyzed for residual epoxide to determine completeness of the reaction. Typically, less than 1% residual epoxide remains under this procedure.

Using glycidyl ethers (i.e., m=1) to stabilize the calixarene-containing resins confers numerous advantages over other known methods in the art for stabilizing calixarene-containing phenolic resins (e.g., alkoxylation with alkylene carbonates). For example, the temperature required in the stabilization reaction procedure is much lower than similar techniques. Using a glycidyl ether to alkoxylate a phenolic resin typically allows for a temperature of 30-50° C. less than alkylene carbonates (e.g., 140° C. for glycidyl ethers compared to 170-180° C. for alkylene carbonates). Additionally, using glycidyl ethers leads to much shorter processing times for solubilizing calixarenes. Procedures using other stabilization techniques call for a reaction time of 3 hours or greater compared to the process disclosed in this invention, which can typically be completed in 2 hours or less. This procedure is also attractive because there are no byproducts normally associated with the stabilization of phenolic resins. For example, no carbon dioxide is evolved using glycidyl ethers. Resins stabilized with epoxides of formula (III), such as glycidyl ethers, are also observed to solubilize linear para-tert-butylphenol chains.

The phenolic resins, e.g., phenolic novolac resins, can be prepared in any suitable manner known in the art for preparation of phenolic resins. Typically, one or more phenolic compounds are reacted with an aldehyde to form a phenolic resin. An additional aldehyde may be added later to adjust the desirable melt point of the phenolic resin. Examples of such processes can be found in U.S. Pat. No. 7,425,602, which is hereby incorporated by reference.

The reaction of the phenolic compound and the aldehyde is conducted in the presence of a base catalyst. Such base-catalyzed reaction results in phenolic resins containing a mixture of linear phenolic resins and calixarenes.

Alternatively, the reaction of the phenolic compound and the aldehyde can also be carried out under high-dilution conditions. For instance, the reaction of the phenolic compound and the aldehyde may be conducted in the presence of a large amount of a solvent, e.g., with the solvent concentration of about 80 wt %.

Suitable phenolic compounds for preparing the phenolic resins include phenol and its derivatives, which may contain one or more substituents on the benzene ring of the phenolic compound, at either the ortho or para position to the hydroxyl of the phenolic compound. If the substituent group is at the para position to the hydroxyl group of the phenolic compound, the resulting alkylene bridge (e.g., methylene bridge if formaldehyde is used) extends in the ortho positions to the hydroxyl group of the phenolic compound. If the substituent group is at the ortho position to the hydroxyl group of the phenolic compound, the resulting alkylene bridge can extend in the para position to the hydroxyl group of the phenolic compound and the other substituted ortho position to the hydroxyl group of the phenolic compound.

The substituent on the benzene ring of the phenolic compound may be $C_1$-$C_{30}$ alkyl, phenyl, or arylalkyl. Typically, the phenolic compound contains one $C_1$ to $C_{18}$ alkyl substituent at the para position. Exemplary phenolic compounds are phenol and alkylphenols including para-methylphenol, para-tert-butylphenol (PTBP), para-sec-butylphenol, para-tert-hexylphenol, para-cyclohexylphenol, para-tert-octylphenol (PTOP), para-isooctylphenol, paradecylphenol, para-dodecylphenol, para-tetradecyl phenol, para-octadecylphenol, para-nonylphenol, para-pentadecylphenol, and para-cetylphenol.

The phenolic resins may be prepared from one or more phenolic compounds reacting with an aldehyde forming an oligomer of repeating units of phenolic monomers. The resulting linear phenolic resin may be a homopolymer of phenolic monomer, or a copolymer containing different units of phenolic monomers, e.g., when two or more different phenolic compounds were reacted with an aldehyde. Similarly, the resulting calixarenes may be a homopolymer of phenolic monomer or a copolymer containing different units of phenolic monomers.

Any aldehyde known in the art for preparing a phenolic resin is suitable in this process. Exemplary aldehydes include formaldehyde, methylformcel, butylformcel, acetaldehyde, propionaldehyde, butyraldehyde, crotonaldehyde, valeraldehyde, caproaldehyde, heptaldehyde, benzaldehyde, as well as compounds that decompose to aldehyde such as paraformaldehyde, trioxane, furfural, hexamethylenetriamine, aldol, β-hydroxybutyraldelhyde, and acetals, and mixtures thereof. A typical aldehyde used is formaldehyde.

To prepare a phenolic resin, the molar ratio of the total amount of an aldehyde to phenolic compounds is in the range from 0.5:1 to 1:1, for instance, from 0.8:1 to 1:1, or from 0.9:1 to 1:1.

The phenolic resins prepared from the above process contain a mixture of linear phenolic resins and cyclic phenolic resins, such as calixarenes. The solubility of calixarenes in these resins is typically poor and, thus, undissolved solids often precipitate out of the resin solution once the phenolic resins are prepared. Typically, about 20 wt % to 40 wt % of the phenolic resins precipitate out of the resin solution almost immediately after the resins are produced, causing the instability of the resins for subsequent utilization. Once these insolubles precipitate out, it is difficult to dissolve the solids in the resin solution, thus reducing the amount of active ingredients (i.e., linear phenolic resins and cyclic phenolic resins) in the resin solution for further utilization and making the handling and transportation of the resin product difficult.

In an aspect of this invention, the phenolic resins are contacted with an epoxide-containing compound of formula (III), an optional catalyst, and at least one hydrocarbon solvent at an elevated temperature for a period of time sufficient to alkoxylate one or more of the phenolic hydroxyl groups of the linear phenolic resins and/or calixarene compounds in the phenolic resin mixture. The phenolic hydroxyl groups of the linear phenolic resins can also be at least partially alkoxylated. By this process, a stabilized phenolic resin is formed with an increased solubility and reduced Tg (glass transition temperature) of the resins, which can provide various benefits. For example, when the molecular weight of the phenolic resin is increased, e.g., to the range of 6000 to 10000 Dalton, the molten viscosity of the resin is high and the resin can become difficult to process. More solvent can be added to reduce the viscosity of the resin, as has been done in conventional processes, but this creates other issues.

The alkoxylation (or etherification) of the phenolic hydroxyl groups of the linear phenolic resin by an epoxide-containing compound of formula (III) (e.g., n-butyl glycidyl ether) is illustrated in the following exemplary scheme, Scheme 1. The alkoxylation (or etherification) of the phenolic hydroxyl groups of the calixarene phenolic resin by an epoxide of formula (III) (e.g., n-butyl glycidyl ether) is illustrated in the following exemplary scheme, Scheme 2.

Schemes 1 and 2 are for illustrative purposes only, and as such they only reflect the formation of one regioisomer (i.e., alkoxylation at the less substituted epoxide-carbon). In practice, the resins may remain unalkoxylated, partially alkoxylated, or fully alkoxylated, with one or both regioisomers forming.

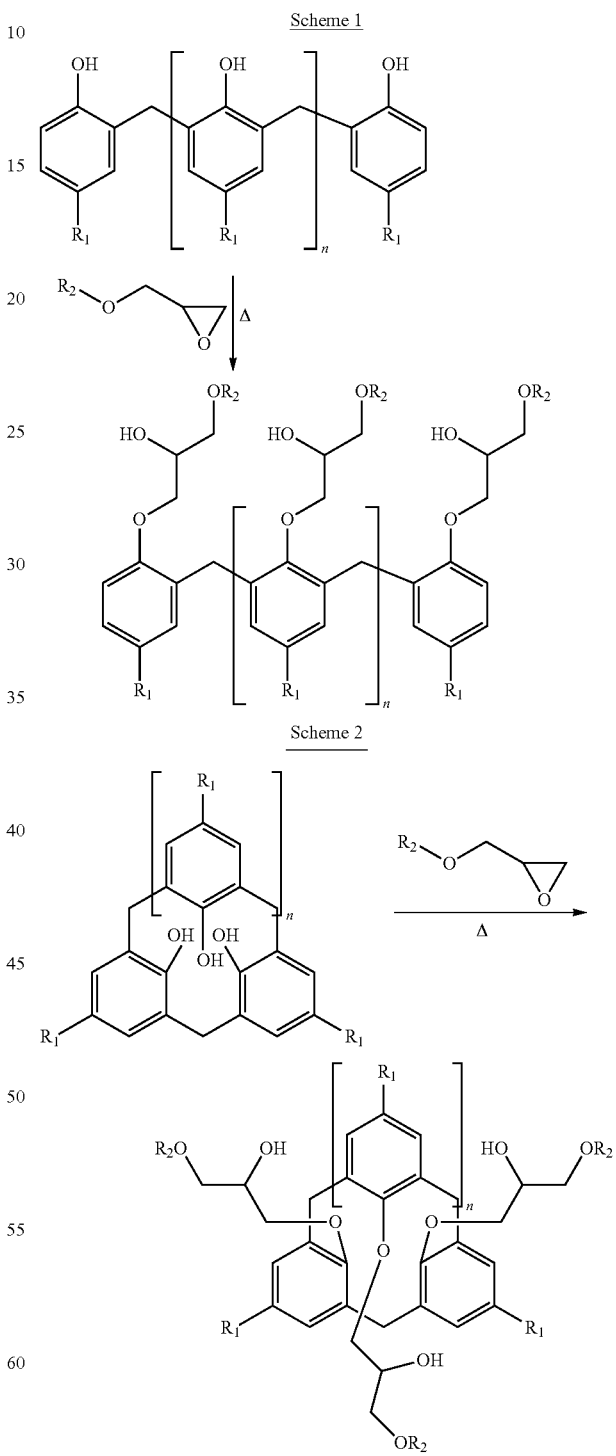

In the above schemes, $R_1$ may be H, $C_1$ to $C_{30}$ alkyl, phenyl, or arylalkyl. Each n is independently 2 to 18. Each $R_2$ is a H, $C_1$ to $C_{20}$ branched or unbranched alkyl which may optionally be substituted with one or more glycidyl ether units of the formula

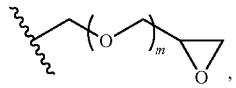

$C_2$ to $C_{10}$ alkenyl, or $C_5$ to $C_{10}$ aryl, where m is an integer from 0 to 10, for instance, from 0 to 8, from 0 to 6, or from 0 to 3.

The amount of epoxide-containing compound of formula (III) added to react with the phenolic resins is in a molar ratio of the epoxide-containing compound to the phenolic hydroxyl units of the phenolic resins ranging from 0.1:1 to 100:1, for instance, from 0.1:1 to 20:1, from 0.2:1 to 3:1, or from 0.2:1 to 2:1. For example, the molar ratio of epoxide-containing compound of formula (III) to phenolic hydroxyl units of the phenolic resins can be greater than 0.2:1, for instance, from 0.25:1 to 1:1, 0.9:1 to 1.2:1, or about 1:1. When greater than 0.25 moles of an epoxide-containing compound of formula (III) is added to 1 mole of the phenolic resins mixture, a complete dissolution of the calixarenes is achieved, resulting in a clear or mostly clear resin solution containing 40-60% resins be weight in an aromatic solvent.

Advantageously, the process of the invention reduces the molten viscosity of the resin without adding additional solvent. The resulting products thus contain a higher percentage of active materials (i.e., linear phenolic resins and cyclic phenolic resins) in the resin solution and a lower percentage of solvent in the resin solution. Accordingly, the process can reduce cost (including the cost in production and in transportation logistics), and improve processing (less solvent is used, yet with improved solubility and molten viscosity).

After the reaction of the phenolic resins with an epoxide of formula (III), the solubility of the linear phenolic resin/ calixarene in a hydrocarbon solvent can be significantly increased, compared to the solubility of the linear phenolic resin/calixarene in the hydrocarbon solvent without subjecting the resin mixture to such process, for instance, by at least 20%, at least 40%, at least 50%, at least 60%, at least 80%, at least 100%, or at least 120%. The hydrocarbon solvent is typically contained in the resulting stabilized phenolic resin because the phenolic resin is typically prepared in the presence of a hydrocarbon solvent, as discussed in the embodiments above.

Accordingly, the reaction of the phenolic resins with an epoxide of formula (III), less than 30% of the calixarenes precipitate out of the solvent after the storage of 24 hours or longer. For instance, less than 20%, less than 10%, or less than 5% of the calixarenes precipitate out of the solvent after the storage of 24 hours or longer. When an appropriate amount of epoxide is reacted with the phenolic resin, the resulting stabilized phenolic resin can be a resin solution substantially free of undissolved solid components, without adding additional solvents to the reaction system, at a temperature of −25° C. or above, for instance at −20° C. or above, at −10° C. or above, at 0° C. or above, at 10° C. or above, or at 20° C. or above.

Another aspect of the invention relates to a stabilized or solubilized phenolic resin prepared from the process described above. A stabilized or solubilized phenolic resin can be prepared by reacting a phenolic resin mixture comprising linear phenolic resins and calixarene compounds having pendant phenolic hydroxyl groups with one or more compounds of formula (III):

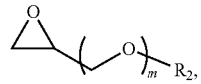

an optional catalyst, and at least one hydrocarbon solvent at an elevated temperature for a period of time sufficient to alkoxylate one or more of the phenolic hydroxyl groups of the linear phenolic resins and/or calixarene compounds in the phenolic resin mixture to result in a resin solution substantially free of undissolved solid components, wherein the solubility of the phenolic resin mixture is increased by at least 20% compared to a phenolic resin mixture that is not subjected to said reacting step, wherein $R_2$ is a H, $C_1$ to $C_{20}$ branched or unbranched alkyl which may optionally be substituted with one or more glycidyl ether units of the formula

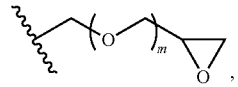

$C_2$ to $C_{10}$ alkenyl, or $C_5$ to $C_{10}$ aryl; and m is an integer from 0 to 10, for instance, from 0 to 8, from 0 to 6, or from 0 to 3.

On average, about 0.1 to about 100 moles, about 0.1 to about 20 moles, about 0.2 to about 3 moles, or about 0.2 to 1 mole of the compound of formula (III) may react with the phenolic hydroxyl groups of the calixarene compounds for each mole of the phenolic units of the phenolic resin.

In the stabilized or solubilized phenolic resins prepared by the process described above, at least 35% of the phenolic hydroxyl groups in the resin have been alkoxylated. For example, at least 40% of the phenolic hydroxyl groups in the resin have been alkoxylated. For example, at least 50% of the phenolic hydroxyl groups in the resin have been alkoxylated. For example, at least 75% of the phenolic hydroxyl groups in the resin have been alkoxylated. For example, at least 90% of the phenolic hydroxyl groups in the resin have been alkoxylated. For example, at least 95% of the phenolic hydroxyl groups in the resin have been alkoxylated.

Preparation of Solubilized Alkoxylated Calixarene Resin

Another aspect of the invention relates to an alkoxylated calixarene resin comprising one or more modified calixarene alkoxylate compounds. Each modified calixarene alkoxylate compound comprises 4-20 units of formula (IV), (V), and/or formula (VI):

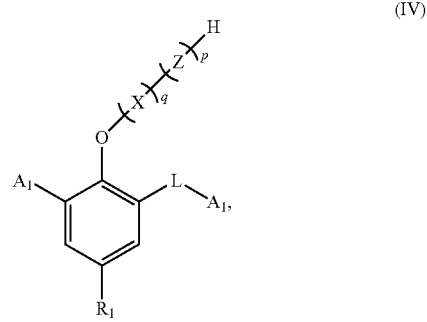

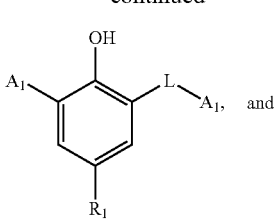

and

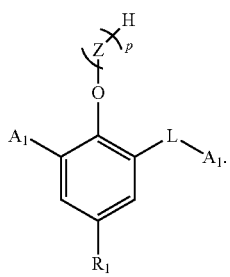

(V)

(VI)

In formulas (IV), (V), and (VI), each X is independently the same or different moiety, each moiety having a structure of

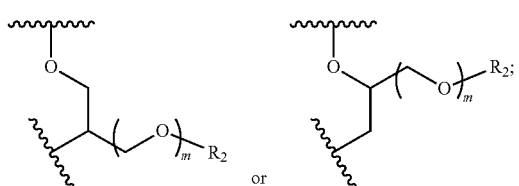

or each Z is independently the same or different moiety, each moiety having a structure of

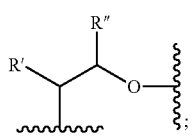

;

each R' and R" are independently H, or $C_1$ to $C_4$ alkyl; each $R_1$ is independently a H, $C_1$ to $C_{30}$ alkyl, phenyl, or arylalkyl; each $R_2$ is independently a H, $C_1$ to $C_{20}$ branched or unbranched alkyl which may optionally be substituted with one or more glycidyl ether units of the formula

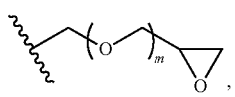

$C_2$ to $C_{10}$ alkenyl, or $C_5$ to $C_{10}$ aryl; each L is independently selected from the group consisting of —$CH_2$—, —C(O)—, —CH($R_3$)—, —($CH_2$)—O—($CH_2$)$_n$—, —C($R_3$)$_2$—, and —S—; each $R_3$ is independently a $C_1$-$C_6$ alkyl; each m is independently an integer from 0 to 10; each n is independently an integer from 1 to 2; each p is independently an integer from 1 to 150; each q is independently an integer from 1 to 100; and each $A_1$ represents a direct covalent bond to an adjacent unit of formula (IV), (V), or formula (VI) such that there is one L group between adjacent units, whereby the total units in the modified calixarene alkoxylate compound form a ring.

The units of formula (IV) make up from about 35% to 100%, from about 40% to about 90%, from about 50% to about 90%, from about 50% to about 80%, or from about 55% to about 75% of the overall units present in the modified calixarene alkoxylate compound. For example, when the modified calixarene alkoxylate compound comprises four units of formula (IV), (V), and/or formula (VI), it may range from having one unit of formula (IV) and three units of formula (V) or (VI), having the structure of

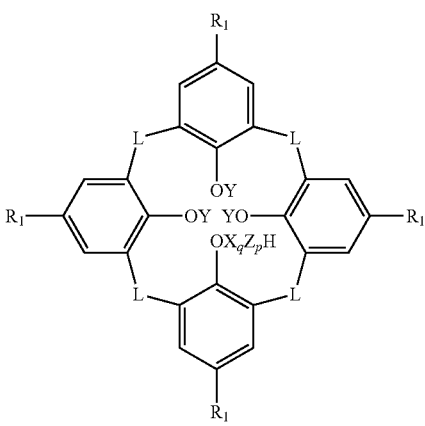

(Y is either H as in formula (V), or —(Z)$_p$H as in formula (VI)), to having all four units of the modified calixarene alkoxylate compound as formula (IV), having the structure of

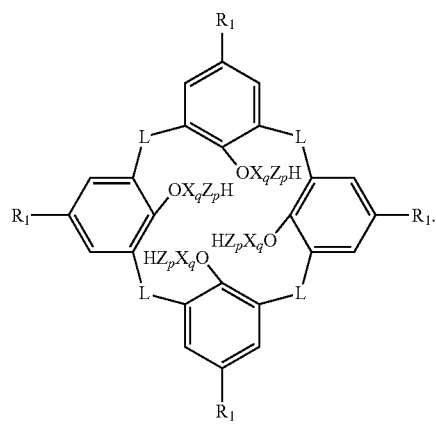

The modified calixarene alkoxylate compounds comprise 4-20 units of formula (IV), (V), and/or formula (VI). For example, the modified calixarene alkoxylate compounds can contain from 4 to 8 units, from 2 to 6 units, from 4 to 6 units, or 6 units of formula (IV), (V), and/or formula (VI).

In the alkoxylated calixarene resins, one or more phenolic hydroxyl groups of the calixarene compounds are modified by two different epoxide-containing compounds. The first modification is the same modification as described in the above embodiments to prepare stabilized (or solubilized) calixarene resins, i.e., the modification via alkoxylation with epoxide-containing compounds of formula (III):

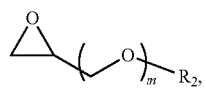

to impart higher solubility in solvents.

The second modification is to modify one or more phenolic hydroxyl groups of the calixarene compounds, after the first modification described above, via alkoxylation with one or more alkylene oxides to append a longer chain oligomer of ether to the calixarene resin, thereby enhancing the demulsifying performance of the calixarene resins. A higher degree of alkoxylation provides a longer chain length for the ether oligomer and can provide a superior improvement in the demulsifying performance of the calixarene resins. However, the hydrophilic-lipophilic balance (HLB) should also be considered, because too much alkoxylation can, depending on other factors appreciated by one skilled in the art, make the calixarene compounds too hydrophilic and may negatively affect the HLB values. Typically, the calixarene compounds are alkoxylated with the alkylene oxides to a p value in formula (IV) or (VI) up to 150, up to 100, up to 50, or up to 20.

The two modifications to the calixarene compounds result in the modified calixarene alkoxylate compounds having the formula (IV), (V), and/or formula (VI). Because the phenolic hydroxyl groups of the calixarene resins may or may not all be alkoxylated with the epoxide-containing compounds of formula (III), and/or the alkylene oxides, the resins can contain a mixture of modified calixarene alkoxylate compounds having various types and degrees of alkoxylations, i.e., various degrees of alkoxylations with the epoxide-containing compounds of formula (III), various degrees of alkoxylations with the alkylene oxides, and various degrees of alkoxylations with both the epoxide-containing compounds of formula (III) and the alkylene oxides. In formula (IV), the compound has been alkoxylated with both the epoxide-containing compounds of formula (III) and the alkylene oxides; in formula (VI), the compound has been alkoxylated with the alkylene oxides but not the epoxide-containing compounds of formula (III); and in formula (V), the compound has not been alkoxylated with either the epoxide-containing compounds of formula (III) or the alkylene oxides.

For each modified calixarene alkoxylate compound resulted therefrom, from about 35% to about 100% of their phenolic hydroxyl groups have been alkoxylated with the epoxide-containing compounds of formula (III) and/or the alkylene oxides. For example, from about 40% to about 90%, from about 50% to about 90%, from about 50% to about 80%, or from about 55% to about 75% of the phenolic hydroxyl groups have been alkoxylated with the epoxide-containing compounds of formula (III) and/or the alkylene oxides.

The modified calixarene alkoxylate compounds can contain mostly formula (IV), or can be a mixture of formula (IV), (V), and/or (VI), in which the phenolic hydroxyl groups of the calixarene compounds have different types and degrees of alkoxylations. In these formulas, m is an integer from 0 to 10, for instance, from 0 to 8, from 0 to 6, or from 0 to 3, such as 0, 1, or 2. Each $R_2$ is independently a H, $C_1$ to $C_{20}$ branched or unbranched alkyl which may optionally be substituted with one or more glycidyl ether units of the formula

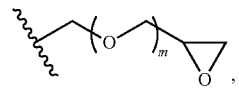

$C_2$ to $C_{10}$ alkenyl, or $C_5$ to $C_{10}$ aryl.

In certain embodiments, m is 1 or 2. For instance, m is 1. In certain embodiments, each $R_2$ is independently selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. For instance, $R_2$ may be butyl, such as n-butyl. Alternatively, each $R_2$ may be independently a $C_1$ to $C_{20}$ branched or unbranched alkyl which may optionally be substituted with one or more glycidyl ether units of the formula

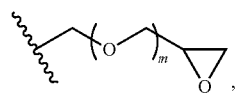

in which m is as defined above. For instance, each $R_2$ can be independently a $C_1$ to $C_8$ branched or unbranched alkyl, substituted with one glycidyl ether units of the formula

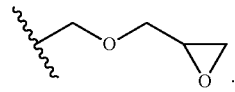

Exemplary $R_2$ is

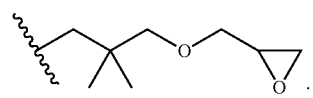 [SMILES: *CC(C)(C)COCC1CO1]

In formulas (IV), and (VI), each X is independently

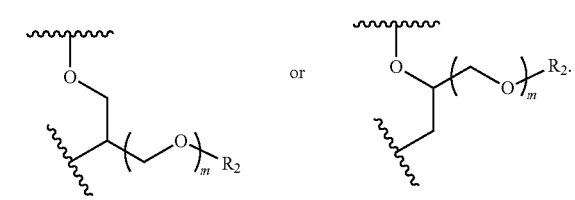

The variable X is the result from the alkoxylation of the phenolic hydroxyl groups of the calixarene compounds by the first epoxide modification to prepare solubilized calixarene resins, as described above, i.e., the modification via alkoxylation with epoxide-containing compounds of formula (III):

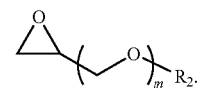

X is selected from the two regioisomers because the phenolic hydroxyl groups may react with an epoxide at the less-substituted and/or more-substituted epoxide carbon, resulting in regioisomer formation. As discussed in the above embodiments when preparing solubilized calixarene resins, the regioselectivity of the alkoxylation can be controlled by means apparent to one having skill in the art, for instance, by controlling solvent selection, sterics, and/or pH.

Depending on the degree of alkoxylation via alkoxylation with the compound of formula (III), the modified calixarene compound can contain q units of X, which can be a random combination of the two regioisomers. One skilled in the art would understand that the two ⅃ in each structure represent the connection points of the X moiety to the formula, so that the carbon atom of the X moiety is connected to the oxygen atom in the phenolic unit of formula (IV) or in a different X moiety, and the oxygen atom of the X moiety is connected to the carbon atom in a different X moiety or to the carbon atom of the Z moiety. For instance, an illustrative structure of formula (IV) containing two units of X moieties can have a structure of

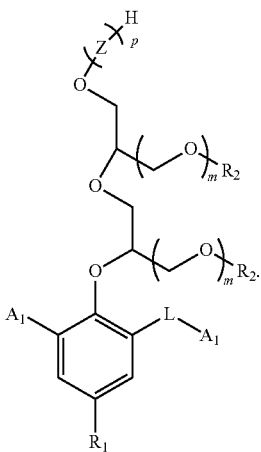

Each q is independently an integer from 1 to 100. The variable q represents the degree of alkoxylation by the compound of formula (III). For instance, each q in each unit of the formula (IV) can be independently 1 to 50, 1 to 20, 1 to 10, 1 to 5, 1 to 3, 1 to 2, or 1. In one embodiment, q is 1 in one or more units in the modified calixarene compounds.

As discussed in the above embodiments when preparing solubilized calixarene resins, the alkoxylations of the phenolic hydroxyl groups of the calixarene compounds by reacting, on average, 1 mole of the compounds of formula (III) for each mole of the phenolic units of the phenolic resin may produce a calixarene compound in which q is 1 on each phenolic unit. It is possible, however, such alkoxylation may also produce a calixarene compound in which q is 2 or more on one or more phenolic units whereas the phenolic hydroxyl groups on other phenolic units of the calixarene compound are left completely unmodified, as in Formula (V), or unmodified by the compound of formula (III), as in Formula (VI), in which q would effectively be zero. It is also possible that such alkoxylation may produce certain calixarene compounds in which the q values vary on one or more of their phenolic units, and certain calixarene compounds that are completely unmodified by the compound of formula (III), i.e., q is zero in each of their phenolic units.

Each Z is independently a same moiety having a structure of or a

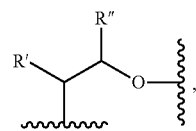

combination of two or more different moieties each having a structure of

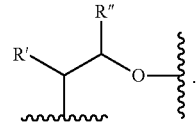

One skilled in the art would understand that the two ⅃ in the structure represent the connection points of the Z moiety to the formula, so that the carbon atom of the Z moiety is connected to the O atom in the X moiety in formula (IV) (or in the phenolic unit of formula (VI)) or in a different Z moiety, and the oxygen atom of the Z moiety is connected to the C atom in a different Z moiety or to the H atom of formula (IV) or (VI). For instance, an illustrative structure of formula (IV) containing two units of Z moieties can have a structure of

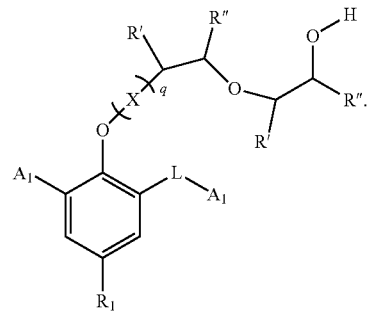

Each R' and R" are independently H, or $C_1$ to $C_4$ alkyl. The variable Z results from the alkoxylation by the second epoxide modification to append a longer chain oligomer of ether to the calixarene resin, i.e., the modification via alkoxylations of the calixarene compounds by the alkylene oxides, as described above. Therefore, depending the type of the alkylene oxides used (i.e., whether a single alkylene oxide or a mixture of different alkylene oxides is used) and the manner in which the alkylene oxides are added (i.e., whether via block addition or simultaneous addition), —$(Z)_p$— in each unit of the formula (IV) or (VI) can be a repeat of p units of the same moiety, or the p units of Z moieties can be a random or block combination of two or more different moieties. Exemplary Z moieties are

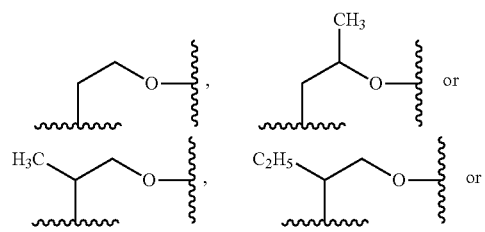

-continued

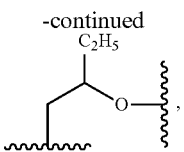

or a combination two or more different moieties of these moieties in various units. In one embodiment, each Z is

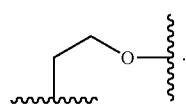 [SMILES: *CCO*]

Additionally, similar to the alkoxylation by the compound of formula (III), the degree of alkoxylation of each calixarene compound in the resin may vary. For instance, by reacting, on average, 1 mole of the alkylene oxide for each mole of the phenolic units of the phenolic resin may produce a calixarene compound in which p is 1 on each phenolic unit. It is possible, however, such alkoxylation may also produce a calixarene compound in which p is 2 or more on one or more phenolic units whereas the other phenolic units of the calixarene compound are left completely unmodified by the alkylene oxides, as in Formula (V), in which p would effectively be zero. It is also possible that such alkoxylation may produce certain calixarene compounds in which the p values vary on one or more of their phenolic units, and certain calixarene compounds that are completely unmodified by the alkylene oxides, i.e., p is zero in each of their phenolic units.

Each p is independently an integer from 1 to 150. The variable p represents the degree of alkoxylation by the alkylene oxides. For instance, each p in each unit of the formula (IV) or (VI) can be independently 1 to 100, 1 to 50, 1 to 20, 1 to 10, 3 to 10, 3 to 5, 2 to 8, or 1 to 5.

In formulas (IV), (V), and (VI), each $R_1$ is independently a H, $C_1$ to $C_{30}$ alkyl, phenyl, or arylalkyl. For instance, each $R_1$ may be independently a $C_4$ to $C_{12}$ alkyl or $C_{24}$ to $C_{28}$ alkyl. Exemplary $R_1$ groups are $C_4$ to $C_{12}$ alkyls. For instance, each $R_1$ is independently tert-butyl, tert-octyl, nonyl, or combinations thereof. In one embodiment, at least one $R_1$ group is $C_1$ to $C_5$ alkyl, such as $C_4$ or $C_5$ alkyl. The calixarene compound may contain units of formula (IV), (V), and/or formula (VI) independently containing random combinations of various $R_1$ groups.

In the modified calixarene alkoxylate compounds, adjacent phenol rings of the phenol resin are connected together through an L group. Each $A_1$ represents a direct covalent bond to an adjacent unit of formula (IV), (V), or formula (VI) such that there is one L group between adjacent units, whereby the total units in the calixarene compound form a ring. For example, four units of formula (IV) can be connected together, having the structure of

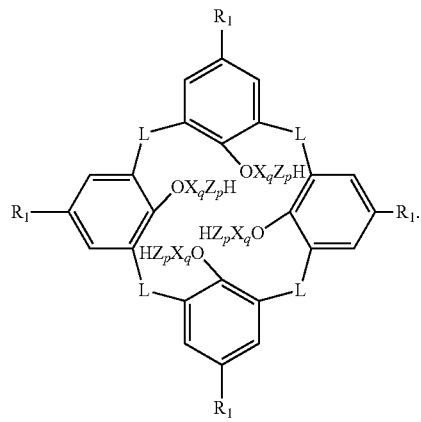

Each L group is selected from the group consisting of —$CH_2$—, —C(O)—, —CH($R_3$)—, —$(CH_2)_n$—O—$(CH_2)_n$—, —$C(R_3)_2$—, and —S—, in which each $R_3$ is independently a $C_1$-$C_6$ alkyl and each n is independently an integer from 1 to 2. For example, L may be —$CH_2$— or —$CH_2$—O—$CH_2$—.

In an embodiment, one or more units in the modified calixarene alkoxylate compounds have the structure of

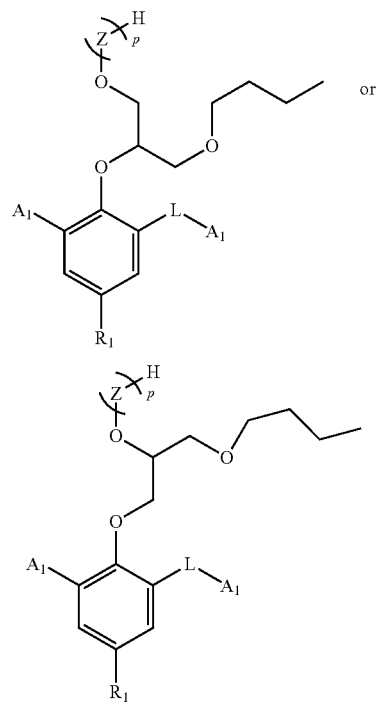

Each $R_1$ is independently a $C_4$ to $C_{12}$ alkyl; each Z is

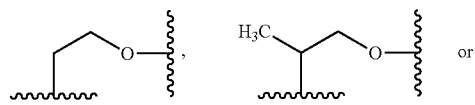

-continued

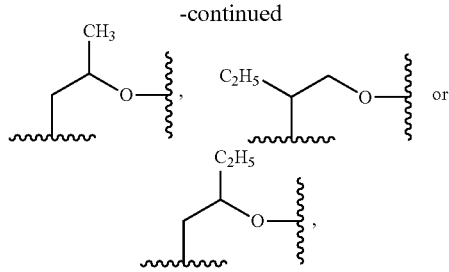

or a combination thereof; each p is independently 1-20; each L is independently —$CH_2$— or —$CH_2$—O—$CH_2$—; and the total units in the calixarene compounds is from 4 to 8.

Another aspect of the invention relates to a resin solution comprising an alkoxylated calixarene resin comprising one or more modified calixarene alkoxylate compounds. Each modified calixarene alkoxylate compound comprises 4-20 units of formula (IV), (V), and/or formula (VI):

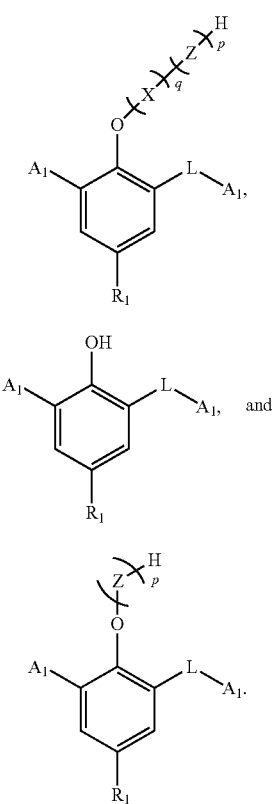

In formulas (IV), (V), and (VI), each X is independently the same or different moiety, each moiety having a structure of

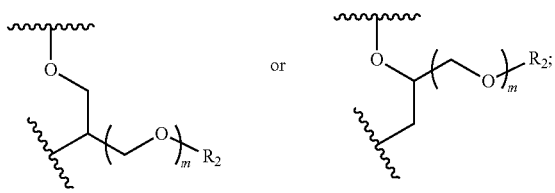

each Z is independently the same or different moiety, each moiety having a structure of

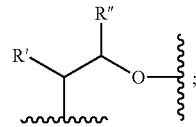

each R' and R" are independently H, or $C_1$ to $C_4$ alkyl; each $R_1$ is independently a H, $C_1$ to $C_{30}$ alkyl, phenyl, or arylalkyl; each $R_2$ is independently a H, $C_1$ to $C_{20}$ branched or unbranched alkyl which may optionally be substituted with one or more glycidyl ether units of the formula

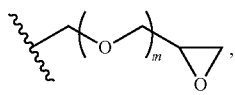

$C_2$ to $C_{10}$ alkenyl, or $C_5$ to $C_{10}$ aryl; each L is independently selected from the group consisting of —$CH_2$—, —C(O)—, —CH($R_3$)—, —$(CH_2)_n$—O—$(CH_2)_n$—, —C($R_3$)$_2$—, and —S—; each $R_3$ is independently a $C_1$-$C_6$ alkyl; each m is independently an integer from 0 to 10; each n is independently an integer from 1 to 2; each p is independently an integer from 1 to 150; each q is independently an integer from 1 to 100; and each $A_1$ represents a direct covalent bond to an adjacent unit of formula (IV), (V), or formula (VI) such that there is one L group between adjacent units, whereby the total units in the modified calixarene alkoxylate compound form a ring. The units of formula (IV) make up from about 35% to 100% of the overall units present in the calixarene compounds.

The alkoxylated calixarene resins are soluble in a hydrocarbon solvent, such as an aromatic hydrocarbon solvent, resulting in a highly concentrated resin solution that can have the concentration of the resin to about 50 wt % to about 75 wt %. As discussed above, exemplary aromatic hydrocarbon solvents are toluene, xylene, tetralin, a $C_9$-$C_{10}$ aromatic hydrocarbon solvent (such as ShellSol® A150 or ShellSol® A150ND), or a $C_{10}$-$C_{12}$ aromatic hydrocarbon solvent (such as Solvesso™ 150).

The resulting resin solution is substantially free of undissolved solid components, under a wide range of temperatures. Also, the resin solution is soluble enough that it can be handled, transported, or stored for a long period of time under a wide range of temperatures without precipitation. For instance, the alkoxylated calixarene resin is soluble in a hydrocarbon solvent at room temperature or above, at 10° C. or above, at 0° C. or above, at −10° C. or above, at −20° C. or above, or at −25° C. or above. For instance, after the storage of 24 hours or longer, less than 20%, less than 10%, or less than 5% of solid components precipitate out of the solvent from the alkoxylated calixarene resin solution.

Accordingly, another aspect of the invention relates to an alkoxylated calixarene resin with an increased solubility in a hydrocarbon solvent, comprising one or more modified calixarene alkoxylate compounds. Each modified calixarene alkoxylate compound comprises 4-20 units of formula (IV), (V), and/or formula (VI):

(IV)

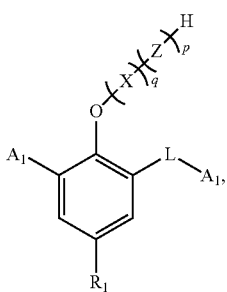

(V)

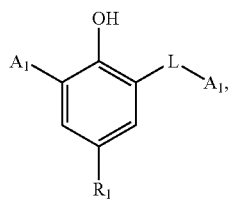

(VI)

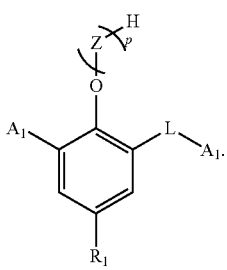

In formulas (IV), (V), and (VI), each X is independently the same or different moiety, each moiety having a structure of

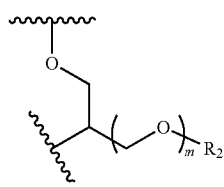 or 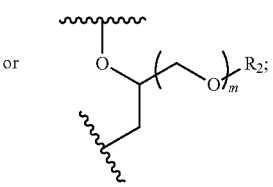

each Z is independently the same or different moiety, each moiety having a structure of

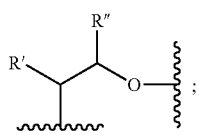

each R' and R" are independently H, or $C_1$ to $C_4$ alkyl; each $R_1$ is independently a H, $C_1$ to $C_{30}$ alkyl, phenyl, or arylalkyl; each $R_2$ is independently a H, $C_1$ to $C_{20}$ branched or unbranched alkyl which may optionally be substituted with one or more glycidyl ether units of the formula

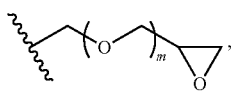

$C_2$ to $C_{10}$ alkenyl, or $C_5$ to $C_{10}$ aryl; each L is independently selected from the group consisting of —$CH_2$—, —C(O)—, —CH($R_3$)—, —($CH_2$)$_n$—O—($CH_2$)$_n$—, —C($R_3$)$_2$—, and —S—; each $R_3$ is independently a $C_1$-$C_6$ alkyl; each m is independently an integer from 0 to 10; each n is independently an integer from 1 to 2; each p is independently an integer from 1 to 150; each q is independently an integer from 1 to 100; and each $A_1$ represents a direct covalent bond to an adjacent unit of formula (IV), (V), or formula (VI) such that there is one L group between adjacent units, whereby the total units in the modified calixarene alkoxylate compound form a ring. The units of formula (IV) make up from about 35% to 100% of the overall units present in the calixarene compounds.

The solubility of the alkoxylated calixarene resin in the hydrocarbon solvent is increased by at least 20%, for instance, at least 40%, at least 50%, at least 60%, at least 80%, at least 100%, or at least 120%, compared to a resin comprising calixarene compounds containing units of formula (V) and/or (VI), but no units of formula (IV).

Another aspect of the invention relates to a process for preparing a solubilized alkoxylated calixarene resin. The process comprises reacting a phenolic resin mixture, comprising linear phenolic resins and calixarene compounds having phenolic hydroxyl groups, with one or more compounds of formula (III):

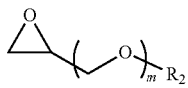

in a hydrocarbon solvent to alkoxylate one or more of the phenolic hydroxyl groups of the calixarene compounds to form a solubilized phenolic resin mixture. In formula (III), $R_2$ is a H, $C_1$ to $C_{20}$ branched or unbranched alkyl which may optionally be substituted with one or more glycidyl ether units of the formula

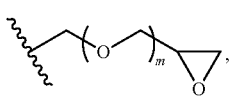

$C_2$ to $C_{10}$ alkenyl, or $C_5$ to $C_{10}$ aryl; and m is an integer from 0 to 10. The solubilized phenolic resin mixture is then reacted with one or more alkylene oxides, thereby forming a solubilized alkoxylated calixarene resin, wherein about 0.1 to about 150 moles of alkylene oxide reacts with each mole of the phenolic units in the solubilized phenolic resin mixture.

The process for preparing a solubilized alkoxylated calixarene resin comprises a first step of forming a stabilized (solubilized) phenolic resin mixture. This step is the same as the above embodiments for the process for stabilizing a phenolic resin containing a mixture of linear phenolic resins and cyclic phenolic resins (e.g., calixarene) to improve the solubility of the phenolic resin in a hydrocarbon solvent. All the descriptions in these embodiments about the starting materials (the phenolic resin mixture and the compound of formula (III) and corresponding variables in the formula such as $R_2$ and m) and their preparation; the catalysts; the optional solvents; and the reaction conditions, including but not limited to, the reaction temperature, reaction time, and concentrations of various reagents in the reaction; and the resulting stabilized (solubilized) phenolic resins and their properties, described herein, are suitable in this step of forming a stabilized (solubilized) phenolic resin mixture.

As discussed in the above embodiments for the process for forming a solubilized phenolic resin mixture, this step results in a resin solution substantially free of undissolved solid components under a wide range of temperatures, and can be handled, transported, or stored for a long period of time under a wide range of temperatures without precipitation. The solubility of the phenolic resin mixture is increased by at least 20%, for instance, at least 40%, at least 50%, at least 60%, at least 80%, at least 100%, or at least 120%, compared to a phenolic resin mixture that is not subjected to said reacting step.

The solubilized phenolic resin mixture prepared according to the embodiments described above is then reacted with one or more alkylene oxides, thereby forming a solubilized alkoxylated calixarene resin. The solubility property of the solubilized alkoxylated calixarene resin are the same as described above for the solubilized phenolic resin mixture.

The term "alkylene oxide" refers to an aliphatic $C_2$ to $C_6$ epoxide. Typically, the alkylene oxide is a cyclic ether having a structure of

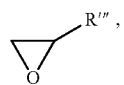

wherein R''' is H or $C_1$-$C_4$ alkyl. For example, suitable alkylene oxides include ethylene oxide, propylene oxide, butylene oxide, and combinations thereof.

When two or more alkylene oxides are used in the reaction, the alkylene oxides may be added in a simultaneous manner or block manner. Simultaneous addition of two or more alkylene oxides involves adding a mixture of different alkylene oxides to the solubilized phenolic resin mixture simultaneously, such that the rate of alkylene oxide addition to the calixarene compounds and the resulting structure of the modified calixarene alkoxylate compounds are controlled by the relative amounts the different alkylene oxides and their reaction rates. For instance, simultaneous addition of a mixture of ethylene oxide and propylene oxide to the above-prepared solubilized phenolic resin mixture can result in a mixture of modified calixarene alkoxylate compounds having various types and degrees of alkoxylations. In certain embodiments, the modified calixarene alkoxylate compounds can contain mostly formula (IV), or can be a mixture of formula (IV), (V), and/or (VI), in which the p units of Z can be a random combination of various units of

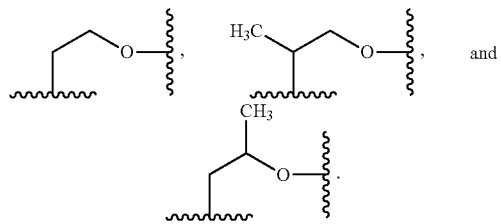

Block addition of two or more alkylene oxides involves adding a first alkylene oxide to the solubilized phenolic resin mixture and allowing the compound to further react with the alkylene oxide to form a block of the same repeating unit resulting from this first alkylene oxide. A second alkylene oxide is then added to the solubilized phenolic resin mixture and reacted in a similar manner to form a block of the same repeating unit resulting from this second alkylene oxide. Subsequent block(s) can be further added by adding additional alkylene oxide(s) which may be the same or different alkylene oxide(s) than the first or second alkylene oxide. For instance, block addition of ethylene oxide and then propylene oxide to the above-prepared solubilized phenolic resin mixture can result in a mixture of modified calixarene alkoxylate compounds having various degrees of alkoxylations. In certain embodiments, the modified calixarene alkoxylate compounds can contain mostly formula (IV), or can be a mixture of formula (IV), (V), and/or (VI), in which —$(Z)_p$— in each unit of the formula (IV) or (VI) can be a combination of a block of repeating units of

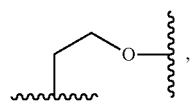

and a block of repeating units of

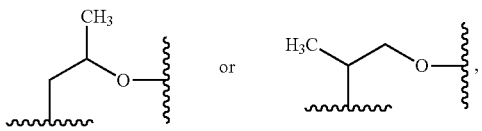

in various units.

Because the regioisomer formation can be random, even when a same alkylene oxide is used for the alkoxylation, addition of each unit of

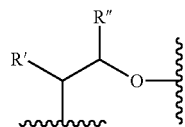

by the alkylene oxide may result in a different regioisomer. Thus, for instance, a block of repeating units

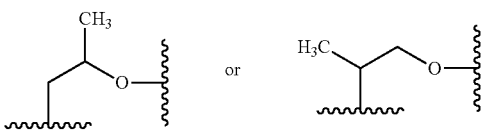

herein does not necessarily refers to a block comprising all repeating units

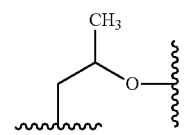

or a block comprising all repeating units

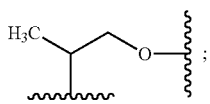

it may also encompass the scenario in which the block contains the random combination of

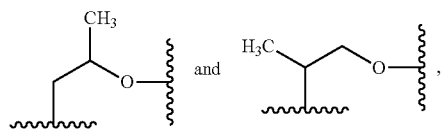

i.e., the block is composed of propylene ether repeating units, just different regioisomers.

Exemplary manners of adding alkylene oxides include adding a single block of ethylene oxide, propylene oxide, or butylene oxide; simultaneous addition of a mixture of two or more of ethylene oxide, propylene oxide, and butylene oxide; and block addition of two or more of ethylene oxide, propylene oxide, and butylene oxide. For instance, a single block of ethylene oxide or propylene oxide is added in this step. Alternatively, a mixture of ethylene oxide and propylene oxide are added in a simultaneous manner. Alternatively, ethylene oxide and propylene oxide are added in a block manner. The sequence of addition can be, for instance, ethylene oxide-propylene oxide, propylene oxide-ethylene oxide, ethylene oxide-propylene oxide-ethylene oxide, or propylene oxide-ethylene oxide-propylene oxide.

The amount of the alkylene oxides added to react with the solubilized phenolic resin mixture is in a molar ratio of alkylene oxide to phenolic units ranging, on average, from about 0.1:1 to about 150:1. For example, the molar ratio of alkylene oxide to phenolic units, on average, can range from about 1:1 to about 100:1, from about 1:1 to about 20:1, from about 3:1 to about 10:1, from about 2:1 to about 8:1, or from 3.4:1 to 4.7:1. The amount of the alkylene oxides added to the reaction depends on the desired increase in the ether oligomer chain length for enhancing the demulsifying performance of the calixarene resins.

The step of alkoxylation by the alkylene oxides may be carried out in the presence of a catalyst to accommodate faster reaction times and/or lower reaction temperatures. The catalyst can be an acid catalyst or a base catalyst. The acid catalyst can be a Lewis acid or a Friedel-Crafts catalyst, such as sulfuric acid, phosphoric acid, or aluminum trichloride.

In an embodiment, the catalyst is present in the process and is a base catalyst. Typical base catalysts include sodium hydroxide, potassium hydroxide, sodium methoxide, potassium methoxide, sodium carbonate, potassium carbonate, sodium bicarbonate, potassium bicarbonate, triethylamine, imidazole, 2-methylimidazole, pyridine, and combinations thereof. The amount of catalyst, if present, may range from about 0.01 wt % to about 5 wt %. For example, the amount of catalyst, if present, may range from about 0.02 wt % to about 5 wt %, or from about 0.5 wt % to about 3 wt %, or from about 0.1 wt % to about 1 wt %, or from about 0.1 wt % to about 0.5 wt %, or from about 0.2 wt % to about 0.3 wt %.

The step of alkoxylation by the alkylene oxides is typically carried out at an elevated temperature, for instance, at a temperature in the range of 50-180° C., 110-170° C., 130-170° C., or 145-155° C.

A typical step of alkoxylation by the alkylene oxides involves heating the solubilized phenolic resin mixture dissolved in an aromatic hydrocarbon solvent and an optional catalyst to about 130-170° C., and adding the desired amount of initial alkylene oxide while maintaining the heating temperature. The alkylene oxide reacts until the system pressure stabilizes, the residual alkylene oxide is consumed, or the reaction is terminated.

The alkoxylation of the calixarene compounds in the solubilized phenolic resin mixture, prepared according to the reaction in Scheme 2, by an alkylene oxide (e.g., ethylene oxide) is illustrated in the following exemplary scheme, Scheme 3. Scheme 3 is presented for illustrative purposes only. In practice, the calixarene compounds in the resin may remain unalkoxylated, partially alkoxylated by the compound of formula (III) and/or the alkylene oxide, or fully alkoxylated by the compound of formula (III) and/or the alkylene oxide, each with various degrees of alkoxylation by the alkylene oxide.

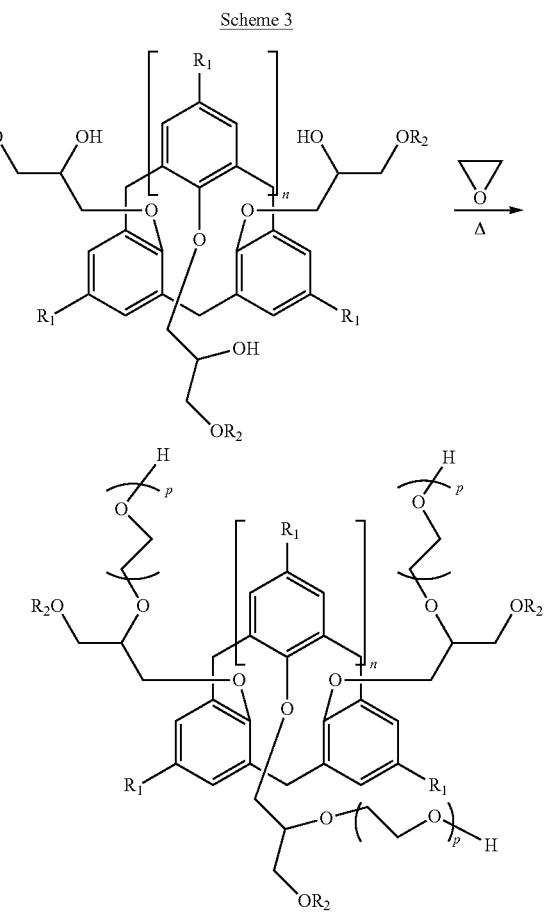

Scheme 3

In the above scheme, $R_1$ may be H, $C_1$ to $C_{30}$ alkyl, phenyl, or arylalkyl. Each n is independently 2 to 18. Each $R_2$ is a H, $C_1$ to $C_{20}$ branched or unbranched alkyl which may optionally be substituted with one or more glycidyl ether units of the formula

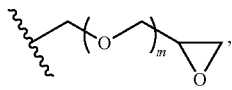

$C_2$ to $C_{10}$ alkenyl, or $C_5$ to $C_{10}$ aryl, where m is an integer from 0 to 10, for instance, from 0 to 8, from 0 to 6, or from 0 to 3. Each p is independently an integer from 1 to 150.

The modified calixarene alkoxylate compounds described above can exist in one or more stereoisomeric form, depending on the reaction conditions for the alkoxylations of the calixarenes. For example, in Scheme 3 above, the hydrophilic alkoxylated chains may extend all on one side of the calixarene plane (the calixarene plane being the macrocyclic ring formed by the calixarene phenolic units); or, alternatively, they may extend on both sides of the calixarene plane. Different stereoisomeric forms can result in modified calixarene alkoxylate compounds with different HLB values and different performances at the oil-water interface.

Another aspect of the invention relates to a solubilized alkoxylated calixarene resin prepared from the process described above. A solubilized alkoxylated calixarene resin can be prepared by reacting a phenolic resin mixture, comprising linear phenolic resins and calixarene compounds having phenolic hydroxyl groups, with one or more compounds of formula (III):

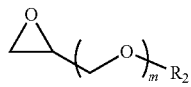

in a hydrocarbon solvent to alkoxylate one or more of the phenolic hydroxyl groups of the calixarene compounds to form a solubilized phenolic resin mixture, and then reacting the formed solubilized phenolic resin mixture with one or more alkylene oxides, wherein about 0.1 to about 150 moles of alkylene oxide reacts with each mole of the phenolic units in the solubilized phenolic resin mixture. In formula (III), $R_2$ is a H, $C_1$ to $C_{20}$ branched or unbranched alkyl which may optionally be substituted with one or more glycidyl ether units of the formula

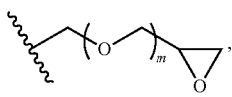

$C_2$ to $C_{10}$ alkenyl, or $C_5$ to $C_{10}$ aryl; and m is an integer from 0 to 10, for instance, from 0 to 8, from 0 to 6, or from 0 to 3.

In the solubilized alkoxylated calixarene resin prepared by the process described above, at least 35% of the phenolic hydroxyl groups in the resin have been alkoxylated with the epoxide-containing compounds of formula (III), and/or the alkylene oxides. For example, at least 40%, at least 50%, at least 75%, at least 80%, at least 90%, or at least 95% of the phenolic hydroxyl groups in the resin have been alkoxylated with the epoxide-containing compounds of formula (III), and/or the alkylene oxides.

Applications

The compounds disclosed herein can be used in a wide range of applications.

For instance, one aspect of the invention relates to a demulsifier composition comprising the resins or comprising the stabilized (solubilized) phenolic resin mixture prepared from alkoxylation by the compound of formula (III), by the process discussed above. The resulting stabilized (solubilized) phenolic resin mixture can be used as a demulsifier or an intermediate for further preparation of a demulsifier comprising one or more other components commonly used in a demulsifier composition, as understood by those of skill in the art.

As known by one skilled in the art, surfactants, demulsifiers, or dehazers are typically amphiphilic compounds that contain both a hydrophobic portion that is water insoluble (oil-soluble) and a hydrophilic portion that is water-soluble. These alkoxylated phenolic resins can therefore be used for a wide variety of applications for oil and water separation, such as refinery, fuel dehazing, oil polisher, water clarifier, or removal of salt from crude oils. Here, for the alkoxylated phenolic resins, the benzene ring or alkyl/aryl substituted benzene ring portion of the alkoxylated phenolic resins serves as the hydrophobic portion and the ether or ether oligomer portion of the alkoxylated phenolic resins serves as the hydrophilic portion. Thus, both the linear alkoxylated phenolic resin and calixarene alkoxylated phenolic resins in the resulting alkoxylated phenolic resins can be used as components serving demulsifying and dehazing functions. The demulsifier composition comprising the resins or comprising the stabilized phenolic resin mixture prepared by the process discussed above may further act as salt-sequestering agents in crude oil. For instance, the demulsifier composition comprising the resins or comprising the stabilized phenolic resin mixture prepared by the process discussed above may be able to sequester salt from crude oil and as a result, reduce salt levels in crude oil.

These alkoxylated phenolic resins are stable and soluble in aromatic solvents. The resin solution of the alkoxylated phenolic resin can reach a concentration of about 50% to about 75% by weight.

Also, the alkoxylated phenolic resins can be further reacted with chemical agents (e.g., other epoxides, alkylene carbonates, or alkylene oxides) to form a longer chain oligomer of ether (e.g., adding additional unit of ether groups by further reacting the ether group of the alkoxylated phenolic resins with the chemical agent). The resulting product with a longer chain oligomer of ether is known in the art to be an effective demulsifier. Thus, the reaction used in the process for preparing the stabilized phenolic resins will not affect the surfactant properties of the desired demulsifier.

Alternatively, the compounds may be used as charge control agents, where, for example, the compounds may be used as coating additives that can be applied to surfaces (e.g., aluminum oil cans) where they can impart charge control. Charge control agents are used to create a desired charge level and polarity. Charge control agents are also useful in toners for developing electrostatic images used for electrophotography, electrostatic recording, electrostatic printing and other purposes and a charge control agent capable of controlling the amount of charges of the toner. The chargeability of such toners is an important factor in electrostatic latent image developing systems. Thus, to appropriately control the charge amount of toner, a charge control agent providing a positive or negative charge is often added to the toner. This technology is further illustrated in U.S. Pat. No. 5,318,883, which is hereby incorporated by reference.

Host molecules: The compounds may be used as host molecules, where they form a complex or an association between one or more calixarene host molecules and one or more guest molecules. That is, the guest molecule may form a complex with the calixarene by fitting into the cavity of the host. By forming this type of complex, it is envisioned that a wide variety of guest molecules may form a complex with the calixarene. For example, the calixarene may aid in compound delivery (e.g., drug-delivery vehicles) by encapsulating a compound within the cavity, thereby aiding in the solubilization of the guest molecule. In a similar light, the compounds may be used as extractants, where, for example, they may be used to extract small molecules or metal ions (e.g., via chelation). This technology is further illustrated in U.S. Pat. No. 7,524,469, which is hereby incorporated by reference. Similarly, the calixarenes may further act as ionophores, where they can transport the metal ions across cell membranes. This technology is further illustrated in U.S. patent application Ser. No. 13/347,765, which is hereby incorporated by reference.

Resists: The compounds may be used in resist technology. For example, the resist may be used for pattern formation and etching to form a hyperfine structure exemplified in a semiconductor device and a semiconductor integrated circuit. For example the resist may be particularly useful for radioactive ray irradiation exposure. This technology is further illustrated in U.S. Pat. No. 7,514,197, which is hereby incorporated by reference. The calixarenes may be used in positive resists or negative resists. Additional applications of the compounds include the resist to fabricate printed circuit boards, sand carving, microelectronics, and patterning and etching of substrates.

Catalysis: The compounds may be used as catalysts for a variety of chemical reactions. For example, Because of their unique topology, complexes in which a calixarene ligand coordinates to a transition metal are potentially valuable for olefin polymerization. Too often, olefin polymerization catalysts based on chelating ligands have poor activity. This is consistent with an energetically favorable trans-coordination of the olefin and growing polymer chain in an octahedral or pseudo-octahedral configuration of active sites. Ideally, the growing polymer chain and complexed olefin would be forced into closer proximity. The calixarene framework creates such an opportunity because the aromatic rings prevent trans-coordination. This technology is further illustrated in U.S. Pat. No. 6,984,599.

Antifoulants: The compounds may be used as antifoulants, where, for example, they may be applied to surfaces that normally undergo biofouling (e.g., ship hulls), where the compounds may inhibit biofouling, or disperse preexisting biofouling.

Thermal stabilizers: The compounds may be used as thermal stabilizers, where, for example, they may be added to various polymers that normally undergo thermal side-products. The compounds may be used as curing agents, where, for example, they may assist in the curing processes of polymers by aiding in cross-linking.

Additionally, the compounds may be used as accelerators; as additives; as binding agents; as stabilizing agents; as adsorbent/absorbant materials; as sequestering agents; as hardeners, etc.

Another aspect of the invention also relates to a demulsifier composition comprising one or more alkoxylated calixarene resins discussed above or comprising the solubilized alkoxylated calixarene resin prepared from alkoxylations by both the compounds of formula (III) and the alkylene oxides, as discussed above. The resulting solubilized alkoxylated calixarene resin comprising one or more modified calixarene alkoxylate compounds (hereafter referred to as "solubilized alkoxylated calixarene resin") can be used as a demulsifier or an intermediate for further preparation of a demulsifier comprising one or more other components commonly used in a demulsifier composition, as understood by those of skill in the art.

All above applications described for the alkoxylated phenolic resins, prepared from alkoxylation by the compound of formula (III) (i.e., the stabilized or solubilized phenolic resin mixture), are also applicable to the alkoxylated calixarene resin or the solubilized alkoxylated calixarene resin, prepared from alkoxylations by both the compounds of formula (III) and the alkylene oxides.

Another aspect of the invention relates to a method of resolving a water-in-oil or oil-in-water emulsion. The method comprises adding to a water-in-oil or oil-in-water emulsion an effective demulsifying amount of one or more alkoxylated calixarene resins discussed above or one or more of the solubilized alkoxylated calixarene resins prepared from alkoxylations by both the compounds of formula (III) and the alkylene oxides, as discussed above. The water-in-oil or oil-in-water emulsion can be a broad range of hydrocarbon emulsions encountered in crude oil production, refining, and chemical processing. For instance, the water-in-oil or oil-in-water emulsion can be a crude oil emulsion, a refinery desalting emulsion, or a crude oil production emulsion.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

EXAMPLES

The following examples are given as particular embodiments of the invention and to demonstrate the practice and advantages thereof. It is to be understood that the examples are given by way of illustration and are not intended to limit the specification or the claims that follow in any manner.

Example 1A:

Synthesis of a Mixture of Calixarene/Linear Alkylphenolic Resins Based on Para-Tert.-Butylphenol and Para-Nonylphenol A reaction vessel was charged with para-butylphenol and para-nonylphenol, Solvesso™ 150ND solvent (an aromatic solvent commercially available from ExxonMobil Chemicals), and sodium hydroxide. Formalin was added to the reaction mixture over a period of 0.5 to 1.5 hours. The reaction mixture was then heated to reflux and the reaction was completed within 3-4 hours, Solvesso™ 150 solvent was added to the reaction mixture to adjust the percentage of the resulting resins to 53-55 wt %. During the reaction, the product started to precipitate out of the resin solution. The final yield was 97%, and the appearance of the product was a suspension of partially insoluble material.

Samples of the final product were left under room temperature, and placed in the freezer at −25° C. for 24 hours. The insoluble solid precipitate was isolated and weighted.

Example 1B (comparative)

Reaction of Calixarene/Linear Alkylphenolic Resins With Propylene Carbonate

A reaction vessel was charged with the resin prepared in Example 1A as described above, and was added to the reaction vessel immediately after the reaction in example 1 was complete, without storage under room temperature or at −25° C. The reaction vessel was heated to 130-140° C. Potassium carbonate was then added. The reaction mixture was stirred and the reaction temperature of the mixture was increased to 170-180° C. Once the reaction temperature reached 170-180° C., propylene carbonate was added slowly. After 3 hours, the reaction was complete.

Samples of the final product from the reaction were left under room temperature, and placed in the freezer at −25° C. for 24 hours. The reaction product showed no precipitate.

Example 1C

Stabilization of the Calixarene With N-Butyl Glycidyl Ether Instead of Propylene Carbonate 80.8 g of the resin prepared in Example 1A, as described above, was added (solid content of 55.13%) in A150ND solvent (0.24 molar equivalents of phenolic hydroxyl units; commercially available from Shell) and 30.4 g of n-butyl glycidyl ether (0.96 molar equivalents of glycidyl ether in relation to the phenolic hydroxyl units) were added to a 250 ml flask equipped with mixing, heat and a reflux condenser. Heat and mixing were started and at 98° C., 0.52 g of 2-methylimidizole was added to the slurry. At 144° C. darkening of the reaction mixture was observed as the reaction product became soluble in the A-150ND solvent. Upon reaching 150° C. the reaction mixture was clear. The clear solution was then held at 150° C. for one hour then cooled and 111.64 g of the reaction product was discharged to a glass jar.

The final product had a viscosity of 426 cP at 25° C. and a MW of 2244, which is higher than the starting resin prepared in Example 1A with a MW of 1593. Due to co-elution with the A-150ND solvent, the % residual n-butyl glycidyl ether was not able to be analyzed by GC, but assumed to be ~2% in the final product based on reaction carried out in A-150 solvent, which does not co-elute with n-butylglycidyl ether (Example 2C). The final product showed no precipitation after being stored for 3 days in the freezer at −25° C.

Example 1D

Stabilization of the Calixarene With a Reduction in the Amount of N-Butyl Glycidyl Ether 78.75 g of the resin prepared in Example 1A as described above, (solid content of 55.13%) was added in A-150ND (0.23 molar equivalents of phenolic hydroxyl units) and 15.25 g of n-butyl glycidyl ether (0.52 molar equivalents of glycidyl ether in relation to the phenolic hydroxyl units) and 0.29 g of 2-methylimidizole were added to a 250 ml flask equipped with mixing, heat and a reflux condenser. Heat and mixing were started and at 150° C. darkening of the reaction mixture was observed as the reaction product became soluble in the A-150ND solvent. Upon reaching 150° C. the reaction mixture was observed to begin clearing. The clear solution was free of any precipitate after 15 minutes. The solution was then held between 148-152° C. for 1.5 hours.

The final product had a MW of 2174 that was higher than the starting resin prepared in Example 1A as described above, with a MW of 1593. Due to co-elution with the A-150ND solvent the % residual n-butyl glycidyl ether was not able to be analyzed by GC, but assumed to be <0.7% in the final product based on reaction carried out in A-150 solvent, which does not co-elute with n-butylglycidyl ether (Example 2C). The final product showed no precipitation after being stored for 3 days in the freezer at −25° C.

Example 1E

Stabilization of the Calixarene Without Using a Catalyst 1000.00 g of the resin prepared in Example 1A as described above (solid content of 55.13%) in A-150ND (2.98 molar equivalents of phenolic hydroxyl units) and 195.00 g of n-butyl glycidyl ether (0.50 molar equivalents of glycidyl ether in relation to the phenolic hydroxyl units) were added to a 2000 ml flask equipped with mixing, heat and a reflux condenser. Heat and mixing were started and at 160° C. and the mixture was held. After 30 darkening of the reaction mixture was observed as the reaction product was becoming soluble in the A-150ND solvent. After an additional two hours the mixture became darker but still not clear. An additional 10.00 g of n-butyl glycidyl ether (0.03 molar equivalents of glycidyl ether in relation to the phenolic hydroxyl units) was added. The solution cleared 30 minutes after the addition. The solution was then held at 160° C. for two hours. The solids content of the solution was determined and the batch was further diluted with 308 g of A-150ND solvent to 47.3%.

The final product had a solids content of 47.3% and was stable after 3 days in the freezer at minus 25° C.

Example 1F

Stabilization of the Calixarene With Neopentyl Glycol Diglycidyl Ether 106 g of the resin prepared in Example 1A as described above (solids content of 54.04%) in A-150ND (0.31 molar equivalents of phenolic hydroxyl units) and 23.1 g of neopentyl glycol diglycidyl ether (0.689 molar equivalents of glycidyl ether in relation to the phenolic hydroxyl units) and 0.25 g of 2-methylimidazole were added to a 250 mL flask equipped with mixing, heat and a reflux condenser. Heat and mixing were started, and at 155° C. darkening of the reaction mixture was observed. After holding at 155° C. for 1.5 hours, the mixture became a clear solution. The clear solution was then held an additional 2 hours at 155° C.

The starting resin had a Mw of 1720 the final reaction product had a Mw of 7493 and the residual neopentyl glycol diglycidyl ether content was 0.35%.

Example 2A

Synthesis of a Mixture of calixarene/linear alkylphenolic resins Based on para-tert-butylphenol A reaction vessel was charged with para-tert-butylphenol, Solvesso™ 150 solvent, and sodium hydroxide. Formalin was added to the reaction mixture over 0.5-1.5 hours. The reaction mixture was then heated to reflux. Once the reaction was complete, and the reaction was completed within 3-4 hours, Solvesso™ 150 solvent was added to the reaction mixture to adjust the percentage of the resulting resins to 53-55%. During the reaction, the product started to precipitate out of the resin solution. The final yield was 97%, and the appearance of the product was a suspension of partially insoluble material.

Example 2B

Reaction of Calixarene/Linear Alkylphenolic Resins With Propylene Carbonate (Comparative)

A reaction vessel was charged with the resin prepared in Example 2A, as described above (containing 53-55% resulting resins). This resin was added to the reaction vessel immediately after the reaction from the previous example was complete, without storage under room temperature or at −25° C. The reaction vessel was heated to 130-140° C. Potassium carbonate was then added. The reaction mixture was stirred and the reaction temperature of the mixture was increased to 170-180° C. Once the reaction temperature reached 170-180° C., propylene carbonate was added slowly. After 3 hours, the reaction was complete.

Samples of the final product from the reaction were left under room temperature, and placed in the freezer at −25° C. for 24 hours. This preparation was not stable and solids had precipitated out of the reaction mass.

Example 2C

Stabilization of the Calixarene With N-Butyl Glycidyl Ether Instead of Propylene Carbonate 300.00 g of reaction mass from of the resin prepared in Example 2A, as described above (solid content of 50.1%) in A-150 (which does not co-elute with the n-butylglycidyl ether) (0.93 molar equivalents of phenolic hydroxyl units) and 115.00 g of n-butyl glycidyl ether (0.95 molar equivalents of glycidyl ether in relation to the phenolic hydroxyl units) and 1.00 g of 2-methylimidazole were added to a 1000 ml flask equipped with mixing, heat and a reflux condenser. Heat and mixing were started and at 150° C. the mixture was observed to darken as the reaction product became soluble in the A-150 solvent. Upon reaching 150° C. the reaction mixture was observed to begin clearing. The clear solution was free of any precipitation after 15 minutes. The solution was then held at 148-152° C. for two hours taking samples every 15 minutes then cooled and 388.0 g of the reaction product was discharged to a glass jar. Eight samples were taken during the hold for analysis total weight in samples was 14.0 g and 11 g of product was cleaned from the flask. Total recovered was 99.30% of theoretical.

| Sample number | % n-butyl glycidyl ether |
|---|---|
| 2C-1 | 13.47 |
| 2C-2 | 4.89 |
| 2C-3 | 2.73 |
| 2C-4 | 1.35 |
| 2C-5 | 0.96 |
| 2C-6 | 0.77 |
| 2C-7 | 0.58 |
| 2C-8 | 0.62 |
| 2C-Final | 0.56 |

The final product showed no precipitation after being stored for 3 days in the freezer at −25° C.

Example 3

Preparation of a solubilized alkoxylated calixarene demulsifer

The following general procedure for preparing a solubilized alkoxylated calixarene demulsifier may be used.

A reactor is charged with 500 grams of solubilized calixarene resin, obtained according to the method described in the above examples, e.g., Example 1D, in Aromatic 150 (62.4 wt %) and potassium hydroxide (1 wt % based on the solid resin loading). The reaction mixture is heated to 145° C. and slowly treated with 315 grams of an alkylene oxide (such as ethylene oxide) (the type and/or amount of the alkylene oxide varies depending on the desirable type and/or degree of alkoxylation) over a period of 10 hours. The reaction temperature is maintained between 145-155° C. After addition of alkylene oxide is complete, the mixture is further heated for 2 hours so that residual alkylene oxide is consumed. The finished product is an alkylene oxide adduct of the solubilized calixarene resin.

Example 4

Bottle Test of the Solubilized Alkoxylated Calixarene Demulsifiers

The oilfield emulsion breaker tests were performed using a standard bottle test procedure.

Emulsion Preparation

Fifty grams of salt was added in 1000 mL deionized water and the solution was stirred until homogenous. The pH of the solution was adjusted to 7.0±0.25, using 0.1 M HCl. To a two-gallon lined paint can, 1000 mL crude oil was added, and the brine solution prepared above was slowly poured in. Once the oil and salt water were added in the can, mixing was started, using a high-shear mixer at a lower speed for 30 minutes, and the mixing speed was gradually increased as needed. Mixing continued for approximately 11 to 12 hours, while the temperature was kept below 45° C.

Bottle Testing Procedure

Each testing bottle was filled with 100 mL emulsion prepared as described above, with the temperature of emulsion in the low 30s ° C. The filled bottles were placed into a water bath, standing up, at 60° C. for 15 minutes without shaking. All bottles were then taken out of the water bath.

25 ppm isopropyl alcohol was added to one testing bottle, which became the blank. 25 ppm of different testing demulsifiers were then added to each of the other testing bottles. All bottles were then shaken at 140 rpm for 5 minutes each time for four times. After each 5-minute period, the bottle was stood up and the water level was checked. All bottles were then shaken at 140 rpm for 10 minutes each time for 3 times. After each 10-minute period, the bottle was stood up and the water level was checked.

All the testing bottles were then evaluated for "water quality" and "interfacial quality" on a scale from 1-5. The results are shown in Tables 1 and 2 below. For water quality evaluation: "1" indicates dirty (worst), "3" indicates hazy, "5" indicates clear water (best), and "2" and "4" represent levels between 1 and 3 and 3 and 5, respectively. For interfacial quality: "0" indicates "Pad" (i.e., there is no observed water separation in the emulsion; worst), "1" indicates "Bag" (like Pad, but has a small amount of water separation in the emulsion), "2" indicates "Fish Eggs" (i.e., large water drops have not coalesced in the emulsion), "3" indicates "webby" (i.e., an emulsion that looks like a spider web), "4" indicates "Slight Rag" (i.e., the emulsion has a large amount of free water drops but no clean water break), and "5" indicates a sharp separation (best).

Water separation (water drop) was measured for each testing bottle and was recorded at timed intervals. This series of measurements indicates the ability of the resin composition being tested to assist in water coalescence from the emulsion.

Basic sediment and water was measured according to the procedures described below. Briefly, test tubes (approximately 12 mL capacity, graduated in %) were filled with 50% xylenes. A top to middle layer of the emulsion sample, after the above-described bottle testing, was carefully removed so that the water near the oil-water interface was not removed. These emulsion samples were added to each test tube to a fluid level reaching the 100% mark. The test tube was covered and shaken to ensure homogeneity and centrifuged for 10 minutes. The water/emulsion levels were measured and the values were each doubled to account for 50% xylene. Two drops of a knockout demulsifier were added to each test tube, shaken to ensure homogeneity, and centrifuged for 10 minutes. The water/emulsion levels were measured and the values were each doubled.

The testing results are summarized in Tables 1-2. The tables compare the oilfield emulsion bottle test results from the crude oil samples mixed with various demulsifiers: solubilized alkoxylated calixarene resins, alkoxylated phenolic resin without solubilization, and alkoxylated calixarene resin without solubilization, against the blank reference (i.e., the crude oil mixed with isopropyl alcohol, without a demulsifier). The crude oil used was West Texas Intermediate grade.

In Table 1, Solubilized Calixarene Alkoxylate represents the ethoxylated, (butyl- and nonyl-phenol)-formaldehyde calixarene resin with solubilization treatment by n-butyl glycidyl ether (n-BGE); Nonyl Resin Alkoxylate represents the ethoxylated nonylphenol-formaldehyde resin without being solubilized (e.g., without being modified by n-BGE); Calixarene Alkoxylate is a commercial ethoxylated (butyl- and nonyl-phenol)-formaldehyde calixarene resin without being solubilized; and Blank indicates the blank reference (the crude oil mixed with isopropyl alcohol, without a demulsifier). The Solubilized Calixarene Alkoxylate demulsifier was prepared according to the general procedure described in Example 3.

TABLE 1

Oilfield emulsion bottle test results

| Sample Description | Basic sediment and water (mL) | Water Quality (0-5) | Interfacial Quality (0-5) |
| --- | --- | --- | --- |
| Nonyl Resin Alkoxylate | 0 | 4 | 4 |
| Solubilized Calixarene Alkoxylate | 0 | 4 | 4 |
| Calixarene Alkoxylate | 0 | 4 | 4 |
| Blank | 46 | 0 | 0 |

The water drop test results for the above samples were compared in FIG. 1. The water drop speed was measured based on ml of free water recorded at a given time point. Generally, the more free water, the faster the water drop at any given time. As shown in FIG. 1, emulsions with any of the demulsifiers added had a water drop rate much higher than the Blank at any given time point, showing the demulsifying performance of these demulsifiers. The Solubilized Alkoxylated Calixarene demulsifier displayed water drop rates comparable to those of Calixarene Alkoxylate and Nonyl Resin Alkoxylate demulsifers in the overall time scale, and even faster water drop rates compared against Nonyl Resin Alkoxylate demulsifer for the first 30 minutes.

In Table 2, Run Nos. A, B, C, and D were conducted to measure different oil samples or testing at a different time. Sample Nonylphenol resin alkoxylate represents the ethoxylated nonylphenol-formaldehyde resin without being solubilized (e.g., without being modified by n-BGE); Sample Calixarene Alkoxylate represents a commercial ethoxylated (butyl- and nonyl-phenol)-formaldehyde calixarene resin without being solubilized; and Samples Solubilized Calixarene Alkoxylate 1-6 represent various ethoxylated, (butyl- and nonyl-phenol)-formaldehyde calixarene resins with solubilization treatment by n-butyl glycidyl ether (n-BGE), by varying the commercial sources of the n-BGE used for the solubilization treatment and the moles of ethylene oxide ("EO") used in the alkoxylation reaction (the average mole loadings of EO per mole of the phenolic units of the resin in preparing the samples are shown in a separate column in Table 2). Blank indicates blank reference (the crude oil mixed with isopropyl alcohol, without a demulsifier). The Solubilized Calixarene Alkoxylate demulsifier samples were prepared according to the general procedure described in Example 3.

TABLE 2

Oilfield emulsion bottle test results

| Run No. | Sample Description | Moles of EO | Dosage Rate (ppm) | Water Drop (mL) @ Time (min) | | | | | | | | Water Quality | Interfacial Quality | Basic Sediment and Water (ml) |
| --- | --- | --- | --- | --- | --- | --- | --- | --- | --- | --- | --- | --- | --- | --- |
| | | | | 0 | 5 | 10 | 15 | 20 | 30 | 45 | 60 | | | |
| A | Nonylphenol Resin Alkoxylate | 6 | 25 | 0 | 18 | 30 | 39 | 46 | 49 | 49 | 50 | 4 | 4 | 0 |
| | Solubilized Calixarene Alkoxylate 1 | 3.5 | 25 | 0 | 18 | 28 | 36 | 39 | 44 | 45 | 46 | 4 | 4 | 0 |
| | Solubilized Calixarene Alkoxylate 2 | 4.5 | 25 | 0 | 8 | 12 | 18 | 20 | 25 | 35 | 45 | 3 | 3 | 0 |
| | Solubilized Calixarene Alkoxylate 3 | 3.4 | 25 | 0 | 30 | 38 | 40 | 45 | 48 | 49 | 49 | 4 | 4 | 0 |
| | Solubilized Calixarene Alkoxylate 4 | 3.7 | 25 | 0 | 20 | 36 | 44 | 48 | 49 | 50 | 50 | 4 | 4 | 0 |
| | Blank | 0 | 25 | 0 | 0 | 0 | 0 | 0 | 0 | 0 | 0 | 0 | 0 | 30 |
| B | Nonylphenol Resin Alkoxylate | 6 | 25 | 0 | 10 | 15 | 19 | 24 | 30 | 42 | 48 | 4 | 4 | 0 |
| | Solubilized Calixarene Alkoxylate 1 | 3.5 | 25 | 0.1 | 15 | 22 | 28 | 30 | 35 | 38 | 40 | 4 | 4 | 2 |

TABLE 2-continued

Oilfield emulsion bottle test results

| Run No. | Sample Description | Moles of EO | Dosage Rate (ppm) | Water Drop (mL) @ Time (min) | | | | | | | | Water Quality | Interfacial Quality | Basic Sediment and Water (ml) |
|---|---|---|---|---|---|---|---|---|---|---|---|---|---|---|
| | | | | 0 | 5 | 10 | 15 | 20 | 30 | 45 | 60 | | | |
| | Solubilized Calixarene Alkoxylate 3 | 3.4 | 25 | 0.1 | 10 | 10 | 18 | 20 | 20 | 30 | 40 | 4 | 4 | 8 |
| | Solubilized Calixarene Alkoxylate 4 | 3.7 | 25 | 0 | 10 | 20 | 25 | 30 | 35 | 42 | 46 | 4 | 4 | 0 |
| | Solubilized Calixarene Alkoxylate 5 | 4 | 25 | 0 | 16 | 23 | 28 | 30 | 34 | 34 | 39 | 3 | 4 | 4 |
| | Solubilized Calixarene Alkoxylate 6 | 4.3 | 25 | 0 | 8 | 14 | 21 | 26 | 29 | 34 | 39 | 3 | 3 | 0 |
| | Calixarene Alkoxylate 1 | 4 | 25 | 0 | 0 | 16 | 20 | 25 | 26 | 28 | 34 | 3 | 2 | 8 |
| | Calixarene Alkoxylate 2 | 6 | 25 | 0 | 0 | 5 | 16 | 20 | 26 | 34 | 40 | 4 | 4 | 10 |
| | Calixarene Alkoxylate 3 | 6 | 25 | 0 | 0 | 10 | 20 | 25 | 32 | 44 | 48 | 5 | 4 | 0 |
| | Calixarene Alkoxylate 4 | 8 | 25 | 0 | 0 | 0 | 0 | 0 | 10 | 10 | 16 | 4 | 3 | 4 |
| | Blank | 0 | 25 | 0 | 0 | 0 | 0 | 0 | 0 | 0 | 0 | 0 | 0 | 48 |
| C | Nonylphenol Resin Alkoxylate | 6 | 25 | 0 | 0 | 30 | 36 | 38 | 39 | 45 | 48 | 4 | 3 | 0 |
| | Solubilized Calixarene Alkoxylate 1 | 3.5 | 25 | 0 | 20 | 38 | 39 | 39 | 39 | 42 | 44 | 4 | 3 | 0 |
| | Solubilized Calixarene Alkoxylate 3 | 3.4 | 25 | 0 | 10 | 18 | 28 | 36 | 39 | 40 | 42 | 4 | 4 | 6 |
| | Solubilized Calixarene Alkoxylate 4 | 3.7 | 25 | 0 | 10 | 28 | 39 | 39 | 40 | 44 | 46 | 4 | 3 | 0 |
| | Solubilized Calixarene Alkoxylate 5 | 4.0 | 25 | 0 | 24 | 36 | 44 | 46 | 46 | 47 | 48 | 4 | 4 | 0 |
| | Solubilized Calixarene Alkoxylate 6 | 4.3 | 25 | 0 | 12 | 25 | 38 | 40 | 40 | 44 | 46 | 4 | 3 | 0 |
| | Calixarene Alkoxylate 1 | 4 | 25 | 0 | 18 | 24 | 25 | 28 | 28 | 34 | 41 | 3 | 3 | 4 |
| | Blank | 0 | 25 | 0 | 0 | 0 | 0 | 0 | 0 | 0 | 0 | 0 | 0 | 44 |
| D | Nonylphenol Resin Alkoxylate | 6 | 25 | 0 | 5 | 42 | 42 | 44 | 44 | 48 | 49 | 4 | 5 | 0 |
| | Solubilized Calixarene Alkoxylate 1 | 3.5 | 25 | 0 | 10 | 30 | 39 | 40 | 40 | 40 | 42 | 3 | 4 | 0 |
| | Solubilized Calixarene Alkoxylate 3 | 3.4 | 25 | 0 | 5 | 20 | 24 | 30 | 35 | 35 | 40 | 3 | 4 | 2 |
| | Solubilized Calixarene Alkoxylate 4 | 3.7 | 25 | 0 | 5 | 36 | 39 | 40 | 40 | 40 | 45 | 4 | 4 | 0 |
| | Solubilized Calixarene Alkoxylate 5 | 4 | 25 | 0 | 22 | 45 | 47 | 48 | 48 | 48 | 48 | 4 | 4 | 0 |
| | Blank | 0 | 25 | 0 | 0 | 0 | 0 | 0 | 0 | 0 | 0 | 0 | 0 | 50 |

Example 5

Turbiscan Test of the Solubilized Alkoxylated Calixarene Demulsifier

The oilfield emulsion breaking performance of the solubilized alkoxylated calixarene demulsifier was further evaluated by Turbiscan tests.

The tests were carried out on crude oil samples with various demulsifiers as described below using a Formulaction Turbiscan™ TOWER Stability Analyzer instrument (Formulaction Inc., Worthington, Ohio). An emulsion of each of the crude oil samples with 50 volume % of a 50,000 TDS NaCl brine was prepared in the laboratory using a high shear mixer. Demulsifier tests were conducted at 40° C., and each emulsion sample was dosed at 100 ppm of a demulsifier diluted in isopropanol to 20 wt % activity, and compared to blank brine samples without being treated with a demulsifier.

After shaking, the emulsion samples were placed in the Turbiscan instrument and allowed to age over 1 hour. During this one-hour period, a scan of the entire sample height for each sample was recorded at one-minute intervals as percent transmittance. At the end of each Turbiscan test, the samples were removed and observations were recorded based on how much water had broken out of the emulsion as well as the water clarity (cloudy and/or colored vs clear and/or colorless). The "mean transmittance value" after 1 hour was calculated from the instrument software for each emulsion sample. This value shows the degree to which the emulsion separated based on the amount of light that passed through the sample. "Full sample" means the scan was carried out over the full range of the emulsified fluid sample, and "water only" means the scan was carried out only over the lower volume layer that contains water. The mean transmittance value can be compared against the blank, or untreated emulsion sample, to determine how well the emulsion has separated.

Figure 2:
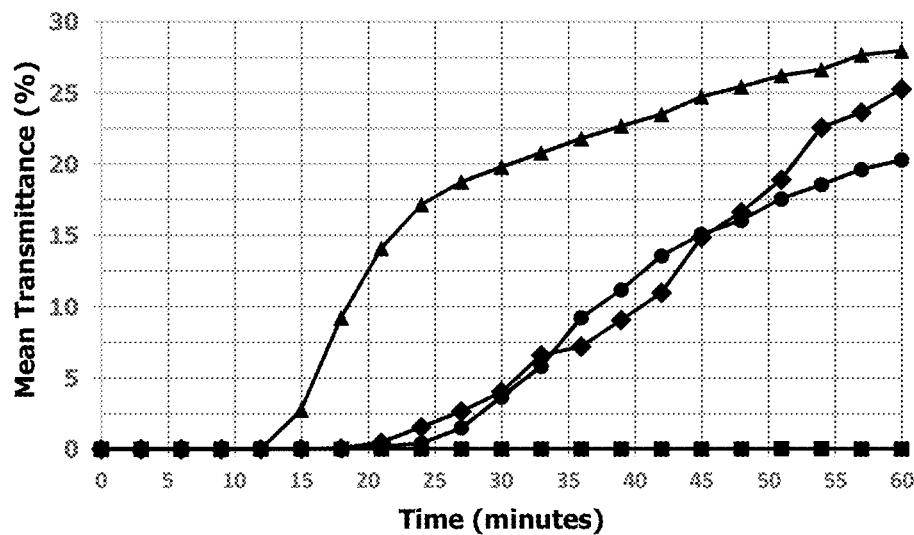
FIG. 2 shows the Turbiscan test results for crude oil sample A mixed with the Nonyl Resin Alkoxylate (represented by the diamond symbols), Solubilized Calixarene Alkoxylate (represented by the circle symbols), Calixarene Alkoxylate (represented by the triangle symbols), and Blank (represented by the square symbols), tested with either the full sample or with water only. The detailed description for each resin demulsifer is described in Example 5.
Figure 2:
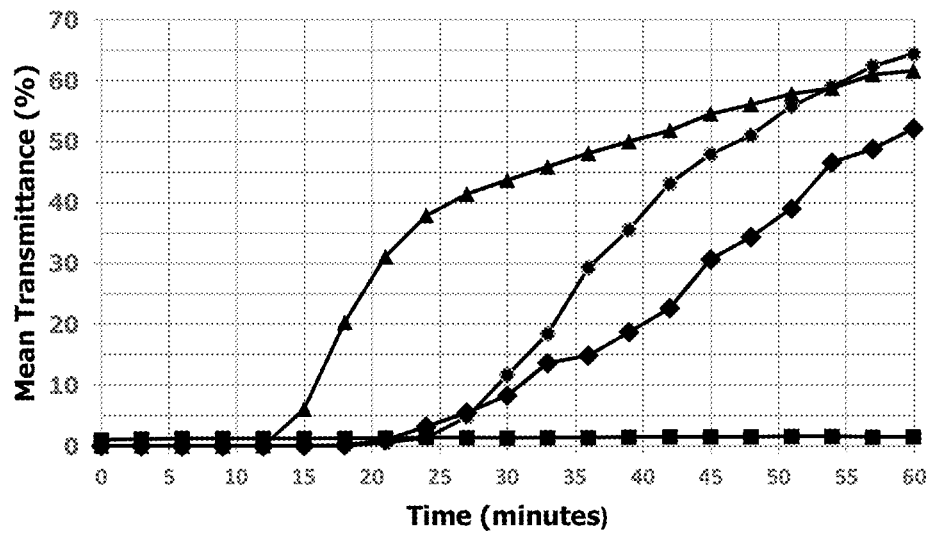
Figure 3:
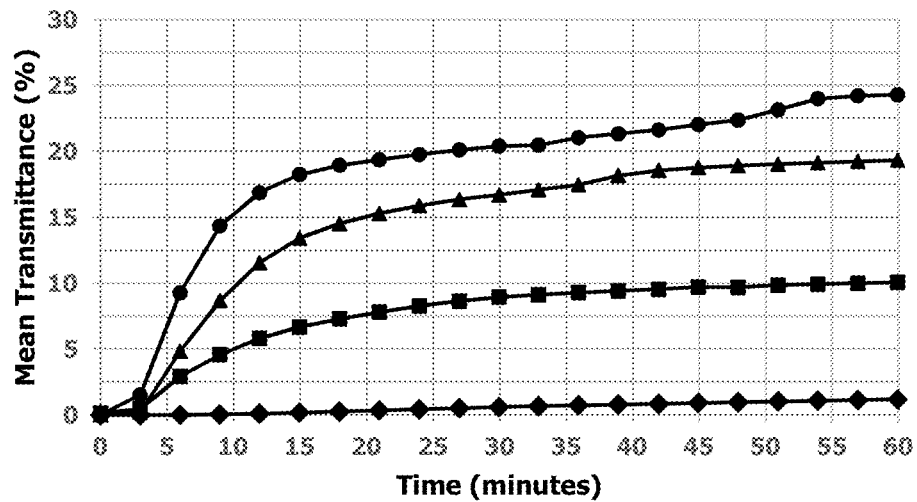
FIG. 3 shows the Turbiscan test results for crude oil sample B mixed with the Nonyl Resin Alkoxylate (represented by the diamond symbols), Solubilized Calixarene Alkoxylate (represented by the circle symbols), Calixarene Alkoxylate (represented by the triangle symbols), and Blank (represented by the square symbols), tested with either the full sample or with water only. The detailed description for each resin demulsifer is described in Example 5.
Figure 3:
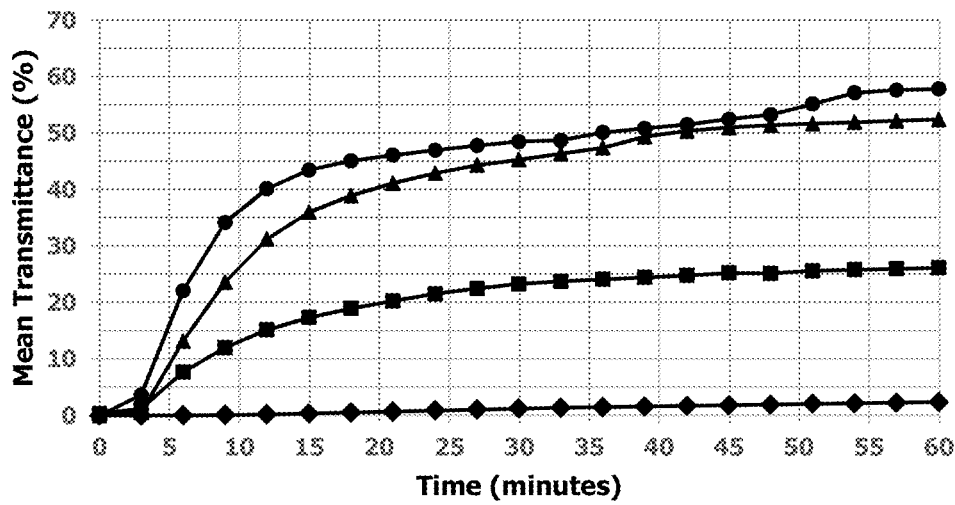
Figure 4:
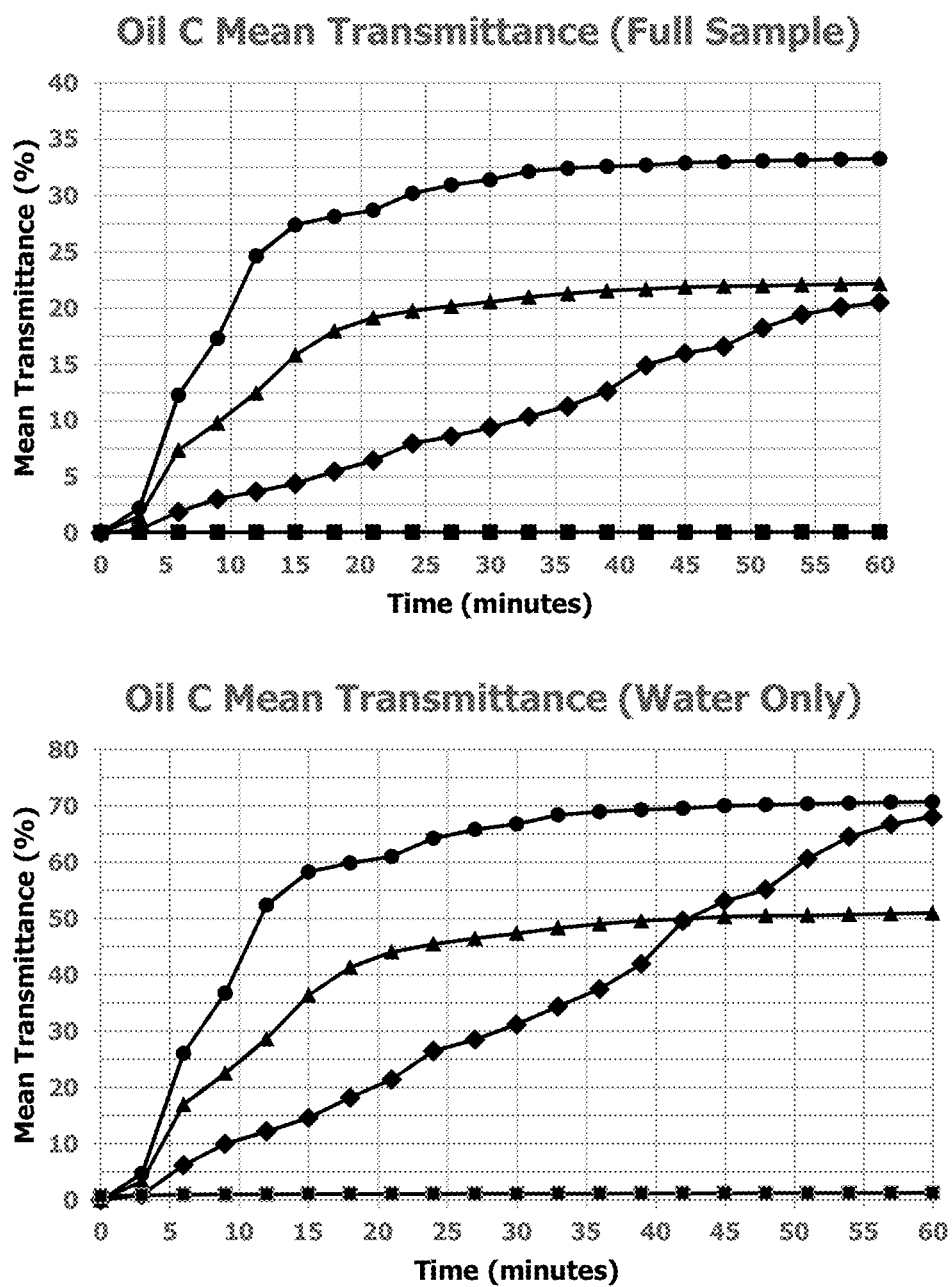
FIG. 4 shows the Turbiscan test results for crude oil sample C mixed with the Nonyl Resin Alkoxylate (represented by the diamond symbols), Solubilized Calixarene Alkoxylate (represented by the circle symbols), Calixarene Alkoxylate (represented by the triangle symbols), and Blank (represented by the square symbols), tested with either the full sample or with water only. The detailed description for each resin demulsifer is described in Example 5.

The Turbiscan test results are summarized in FIGS. 2-4. Oils A, B, and C represent different crude oil samples from Gulf of Mexico having API gravity (American Petroleum Institute gravity) ranging from 21 to 33. The properties for these oils are listed in Table 3.

TABLE 3

The properties for the crude oil samples

| Oil | Specific Gravity | API (calc.) | Asphaltene instability |
|---|---|---|---|
| Oil A | 0.9243 | 21.59 | N |
| Oil B | 0.8616 | 32.73 | N |
| Oil C | 0.8723 | 30.71 | Y |

In FIGS. 2-5, Solubilized Calixarene Alkoxylates represents the ethoxylated, (butyl- and nonyl-phenol)-formaldehyde calixarene resin with solubilization treatment by n-butyl glycidyl ether (n-BGE); Nonyl Resin Alkoxylate represents the ethoxylated nonylphenol-formaldehyde resin without being solubilized (e.g., without being modified by n-BGE); Calixarene Alkoxylate is a commercial ethoxylated (butyl- and nonyl-phenol)-formaldehyde calixarene resin without being solubilized; and Blank indicates the blank reference (the crude oil mixed with isopropyl alcohol, without a demulsifier). The Solubilized Calixarene Alkoxylate demulsifier samples were prepared according to the general procedure described in Example 3.

The "Full Sample" results in FIG. 2 show that, for Oil A, Calixarene Alkoxylates demonstrated a better demulsifying performance (measured by the mean transmittance) over Solubilized Calixarene Alkoxylates, which demonstrated a demulsifying performance comparable to Nonyl Resin Alkoxylate. All three demulsifiers had a clarity much better than the Blank at any given time point, showing the demulsifying performance of these demulsifiers. The pictures in FIG. 5 after the 60-minute bottle test show clean water break and clarity of these treated emulsions.

The "Full Sample" results in FIG. 3 show that, for Oil B, Solubilized Calixarene Alkoxylate demonstrated a better demulsifying performance than Calixarene Alkoxylate, both of which demonstrated a much better demulsifying performance over Nonyl Resin Alkoxylate. The pictures in FIG. 5 after the 60-minute bottle test show that Nonyl Resin Alkoxylate caused the formation of a thick rag layer that was not present in the emulsions mixed with Solubilized Calixarene Alkoxylate and Calixarene Alkoxylate.

The "Full Sample" results in FIG. 4 show that, for Oil C, Solubilized Calixarene Alkoxylate demonstrated a better demulsifying performance than Calixarene Alkoxylate and Nonyl Resin Alkoxylate. All three demulsifiers had a clarity much better than the Blank at any given time point, showing the demulsifying performance of these demulsifiers. Solubilized Calixarene Alkoxylate demonstrated a demulsifying performance about 5 times greater than Nonyl Resin Alkoxylate and about 1.5 times greater than Calixarene Alkoxylate at the 20-minute mark.

The "Water Only" results in these figures are similar to those of the "Full Sample" results. In sum, these results show that Solubilized Calixarene Alkoxylates samples have effective demulsification properties compared to Calixarene Alkoxylate and Nonyl Resin Alkoxylate.

Figure 5:
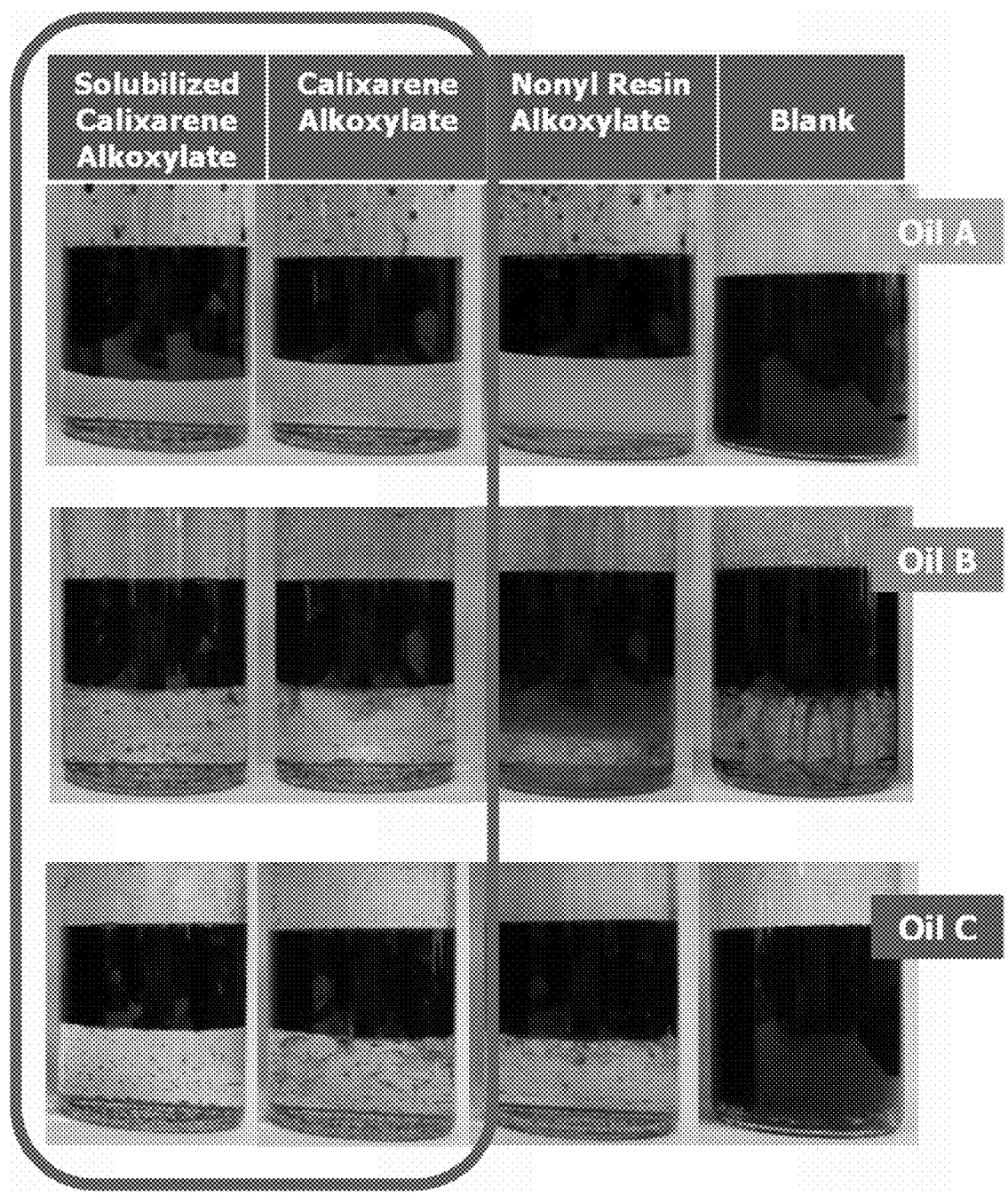
FIG. 5 shows pictures comparing the crude oil samples A-C, each mixed with the Nonyl Resin Alkoxylate, Solubilized Calixarene Alkoxylate, Calixarene Alkoxylate, and Blank. The detailed description for each resin demulsifer is described in Example 5.

FIG. 5 shows the pictures comparing the crude oil samples A-C mixed with the Nonyl Resin Alkoxylate, Solubilized Calixarene Alkoxylate, Calixarene Alkoxylate, and Blank. The oils mixed with the Solubilized Calixarene Alkoxylate have improved water clarity compared to the oils mixed with Calixarene Alkoxylate and Nonyl Resin Alkoxylate. As can be observed in these pictures, Solubilized Alkoxylated Calixarene resins provide an improved demulsifying performance.

Although preferred embodiments have been depicted and described in detail herein, it will be apparent to those skilled in the art that various modifications, additions, substitutions, and the like can be made without departing from the spirit of the invention and these are therefore considered to be within the scope of the invention as defined in the claims which follow.

We claim:

1. An alkoxylated calixarene resin comprising one or more modified calixarene alkoxylate compounds, each modified calixarene alkoxylate compound comprising 4-20 units of formula (IV), (V), and/or formula (VI):

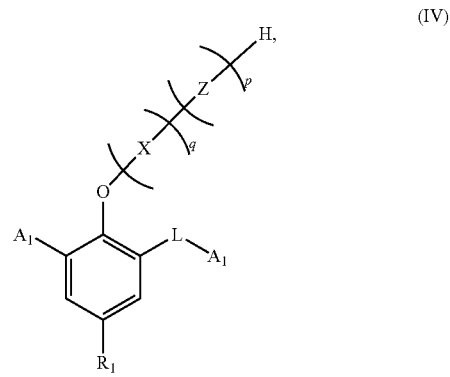

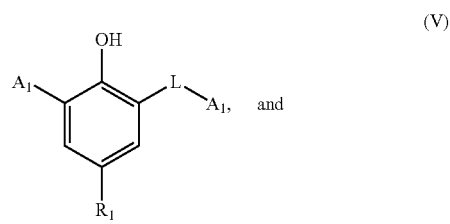

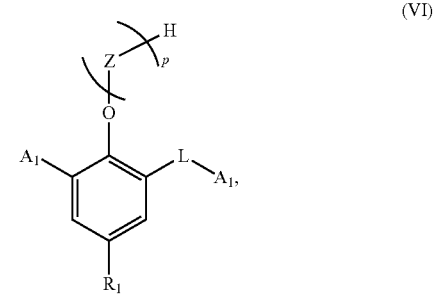

wherein:
each X is independently the same or different moiety, each moiety having a structure of

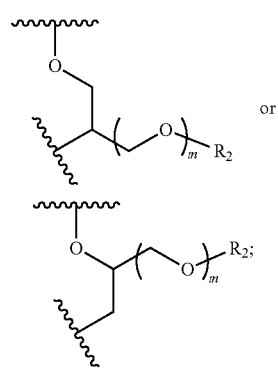

each Z is independently the same or different moiety, each moiety having a structure of

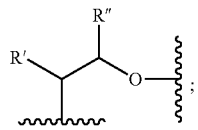

each R' and R" are independently H, or $C_1$ to $C_4$ alkyl;
each $R_1$ is independently a H, $C_1$ to $C_{30}$ alkyl, phenyl, or arylalkyl;
each $R_2$ is independently a H, $C_1$ to $C_{20}$ branched or unbranched alkyl which may optionally be substituted with one or more glycidyl ether units of the formula

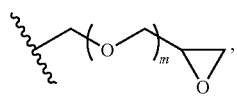

$C_2$ to $C_{10}$ alkenyl, or $C_5$ to $C_{10}$ aryl;
each L is independently selected from the group consisting of —$CH_2$—, —C(O)—, —$CH(R_3)$—, —$(CH_2)_n$—O—$(CH_2)_n$—, —$C(R_3)_2$—, and —S—;
each $R_3$ is independently a $C_1$-$C_6$ alkyl;
each m is independently an integer from 0 to 10; provided that when m is 0, each $R_2$ is independently a $C_5$ to $C_{10}$ aryl;
each n is independently an integer from 1 to 2;
each p is independently an integer from 1 to 150;
each q is independently an integer from 1 to 100; and
each $A_1$ represents a direct covalent bond to an adjacent unit of formula (IV), (V), or formula (VI) such that there is one L group between adjacent units, whereby the total units in the modified calixarene alkoxylate compound form a ring; and
wherein the units of formula (IV) make up from about 35% to 100% of the overall units present in the modified calixarene alkoxylate compounds.

2. The alkoxylated calixarene resin of claim 1, wherein each m is 1.

3. The alkoxylated calixarene resin of claim 2, wherein each $R_2$ is independently selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl; or is independently a $C_1$ to $C_8$ branched or unbranched alkyl, substituted with one or more glycidyl ether units of the formula

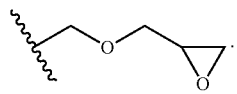

4. The alkoxylated calixarene resin of claim 3, wherein each $R_2$ is n-butyl or

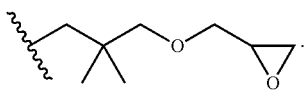 [SMILES: *CC(C)(C)COCC1CO1]

5. The alkoxylated calixarene resin of claim 1, wherein each Z is

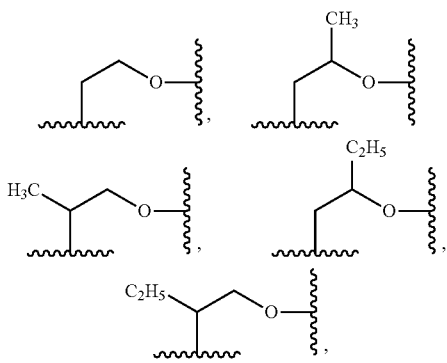

or a combination thereof.

6. The alkoxylated calixarene resin of claim 1, wherein each p is independently 1-20.

7. The alkoxylated calixarene resin of claim 1, wherein each $R_1$ is independently a $C_4$ to $C_{12}$ alkyl or $C_{24}$ to $C_{28}$ alkyl.

8. The alkoxylated calixarene resin of claim 1, wherein the total number of units in the calixarene compounds is from 4 to 8.

9. The alkoxylated calixarene resin of claim 1, wherein one or more units in the modified calixarene alkoxylate compounds have the structure of

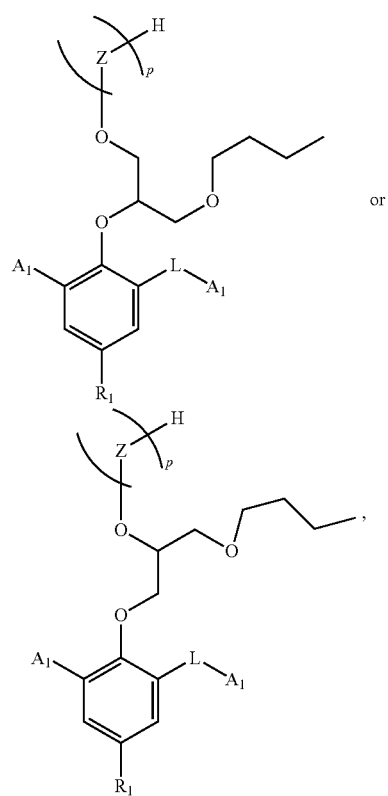

wherein:
each $R_1$ is independently a $C_4$ to $C_{12}$ alkyl;
each Z is

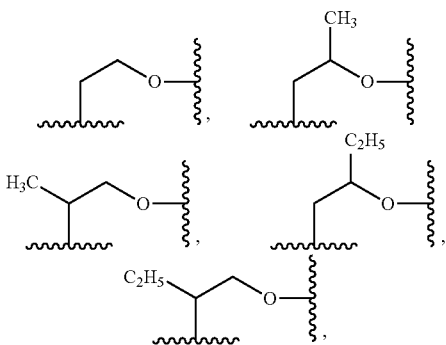

or a combination thereof;
each p is independently 1-20;
each L is independently —$CH_2$— or —$CH_2$—O—$CH_2$—;
and
the total units in the calixarene compounds is from 4 to 8.

10. The alkoxylated calixarene resin of claim 1, wherein the alkoxylated calixarene resin has a solubility in a hydrocarbon solvent increased by at least 20% compared to a resin comprising calixarene compounds containing units of formula (V) and/or (VI), but no units of formula (IV).

11. A resin solution comprising the alkoxylated calixarene resin of claim 1, wherein the alkoxylated calixarene resin is dissolved in a hydrocarbon solvent having a concentration of about 50 wt % to about 75 wt %.

12. The resin solution of claim 11, wherein the hydrocarbon solvent is an aromatic hydrocarbon solvent selected from the group consisting of toluene, xylene, tetralin, a $C_9$-$C_{10}$ aromatic hydrocarbon solvent, and a $C_{10}$-$C_{12}$ aromatic hydrocarbon solvent.

13. A method of resolving a water-in-oil or oil-in-water emulsion, comprising:
adding to a water-in-oil or oil-in-water emulsion an effective demulsifying amount of one or more alkoxylated calixarene resins of claim 1.

* * * * *